US009688475B2

(12) United States Patent
Kamps et al.

(10) Patent No.: US 9,688,475 B2
(45) Date of Patent: Jun. 27, 2017

(54) METHOD AND CONVEYOR DEVICE FOR CONVEYING BULK MATERIAL

(71) Applicant: BUEHLER GMBH, Beilngries (DE)

(72) Inventors: Rolf Kamps, Nuglar (CH); Bertram Pscherer, Beilngries (DE)

(73) Assignee: BUEHLER GMBH, Beilngries (DE)

( * ) Notice: Subject to any disclaimer, the term of this patent is extended or adjusted under 35 U.S.C. 154(b) by 0 days.

(21) Appl. No.: 14/891,101

(22) PCT Filed: Nov. 14, 2013

(86) PCT No.: PCT/EP2013/073824
§ 371 (c)(1),
(2) Date: Nov. 13, 2015

(87) PCT Pub. No.: WO2014/183810
PCT Pub. Date: Nov. 20, 2014

(65) Prior Publication Data
US 2016/0083189 A1 Mar. 24, 2016

(30) Foreign Application Priority Data

May 15, 2013 (WO) .................. PCT/EP2013/060046

(51) Int. Cl.
*B65G 19/14* (2006.01)
*B65G 19/08* (2006.01)
(Continued)

(52) U.S. Cl.
CPC ............. *B65G 19/14* (2013.01); *B65G 19/22* (2013.01); *B65G 35/06* (2013.01); *B65G 35/066* (2013.01)

(58) Field of Classification Search
CPC ........ B65G 19/14; B65G 19/16; B65G 19/22; B65G 19/24; B65G 19/28
(Continued)

(56) References Cited

U.S. PATENT DOCUMENTS 2,357,651 A * 9/1944 Hapman ................ B65G 19/14
  198/716
2,601,248 A 6/1952 Brenholdt
(Continued)

FOREIGN PATENT DOCUMENTS

CN 201598001 10/2010
CN 202807680 3/2013
(Continued)

OTHER PUBLICATIONS

International Search Report issued in PCT/EP2013/073824, dated Mar. 13, 2014.
(Continued)

*Primary Examiner* — James R Bidwell
(74) *Attorney, Agent, or Firm* — Greenblum & Bernstein, P.L.C.

(57) ABSTRACT

A method for conveying bulk goods and a device for carrying out the method. The conveying device includes a conveying channel and at least two conveying elements arranged loosely in the conveying channel. The conveying elements are mechanically driven in the conveying direction in a first section of the conveying channel, before bulk goods are fed into the conveying channel in a second section of the conveying channel. The bulk goods are conveyed by movement of the conveying elements along the conveying direction in a third section of the conveying channel, wherein in the third section of the conveying channel the first conveying element is pressed by the second conveying element and/or the bulk goods through the conveying channel in the conveying direction.

15 Claims, 33 Drawing Sheets

(51) Int. Cl.
  *B65G 19/22* (2006.01)
  *B65G 35/06* (2006.01)
(58) Field of Classification Search
  USPC ........................................ 198/716, 733, 735
  See application file for complete search history.

(56) References Cited

U.S. PATENT DOCUMENTS

| | | | | |
|---|---|---|---|---|
| 2,643,760 A * | 6/1953 | Bortner | ................. | B65G 19/14 |
| | | | | 198/716 |
| 4,197,938 A | 4/1980 | Klinkenberg | | |
| 4,724,772 A | 2/1988 | Krogsrud | | |
| 5,147,029 A | 9/1992 | Wadell | | |
| 7,975,838 B2 * | 7/2011 | Reist | ...................... | B65G 17/38 |
| | | | | 198/833 |
| 2007/0170043 A1 * | 7/2007 | Raijmakers | ............ | B65G 19/14 |
| | | | | 198/716 |

FOREIGN PATENT DOCUMENTS

| | | |
|---|---|---|
| EP | 0422261 | 4/1991 |
| NL | 7908168 | 6/1981 |
| NL | 1025855 | 10/2005 |
| NL | 1038126 | 1/2012 |
| WO | 2005/035404 | 4/2005 |

OTHER PUBLICATIONS

International Preliminary Examination Report in PCT/EP2013/073824, issued on Nov. 17, 2015.
Office Action conducted in counterpart Chinese Application No. 201380076273.8, dated Jul. 5, 2016 with English language translation thereof.
Office Action from counterpart Canadian Application No. 2,912,333, dated Oct. 17, 2016.
Chinese Office Action issued in Counterpart Patent Appl. No. 201380076273.8, dated Jan. 22, 2017, along with an english translation thereof.
Russian Search Report issued in Patent Application No. 201548928, dated Dec. 8, 2016.
Korean Office Action issued in Counterpart Patent Appl. No. 10-2015-7035381, dated Nov. 29, 2016, and an English translation thereof.

* cited by examiner

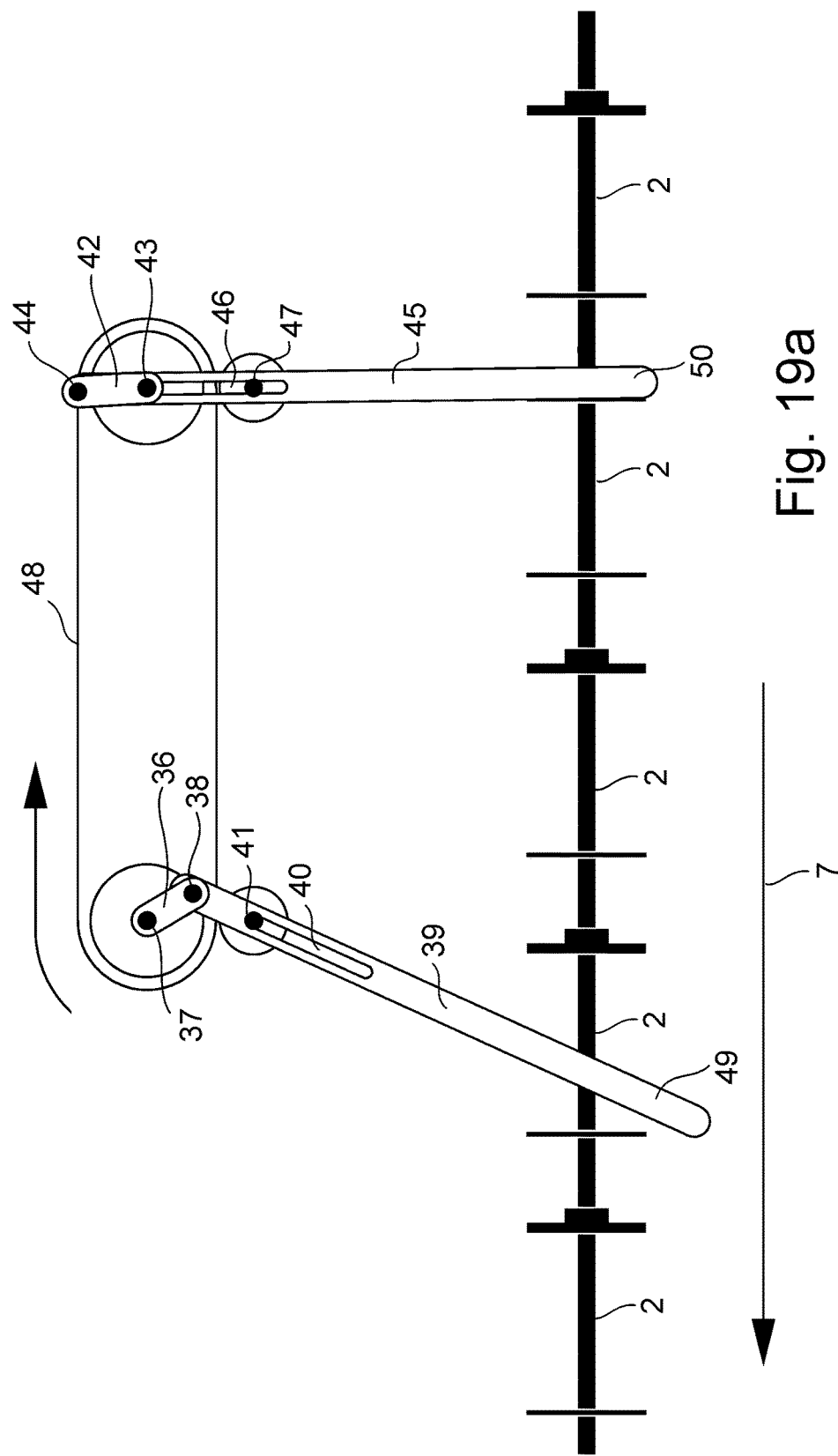

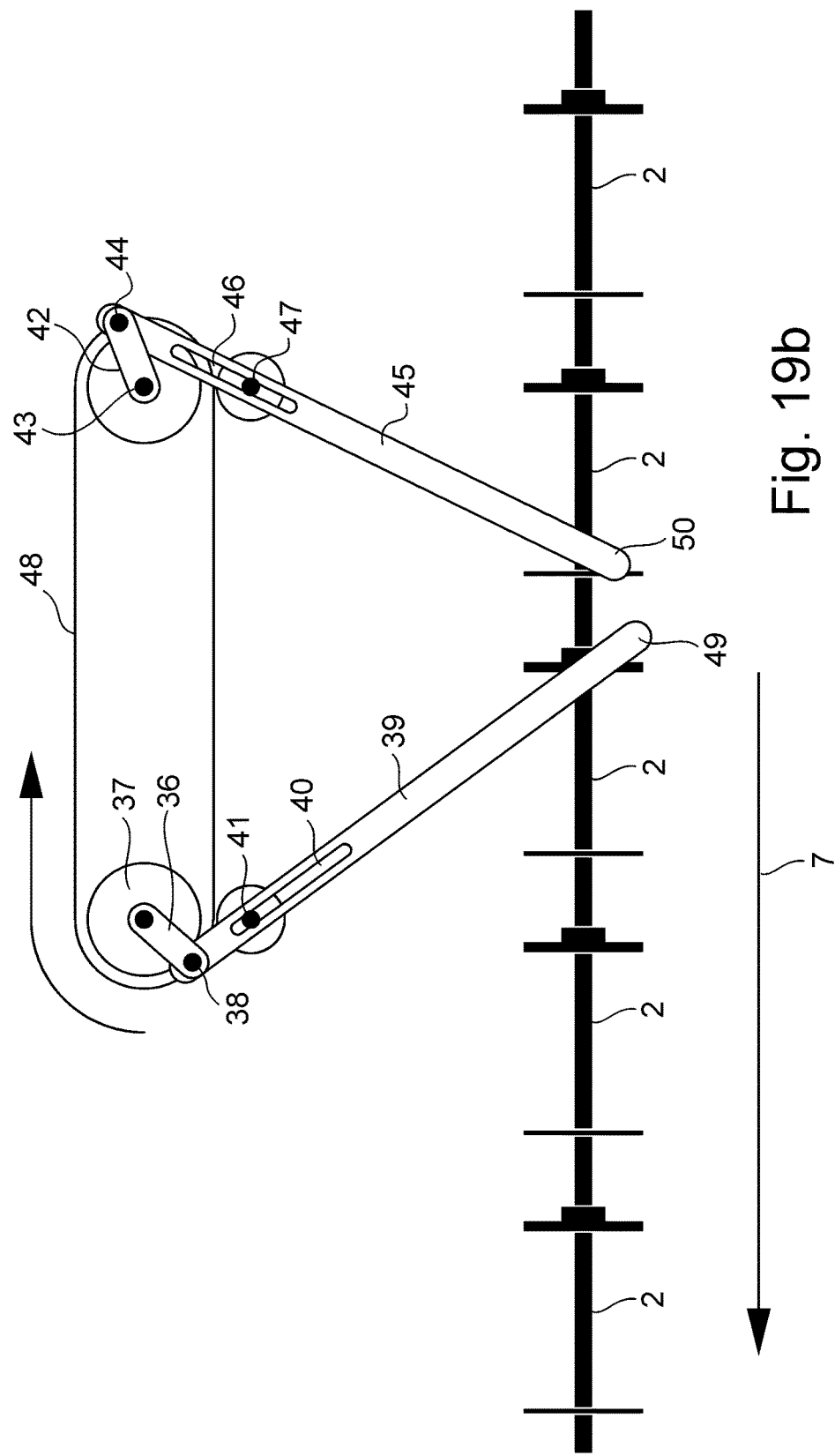

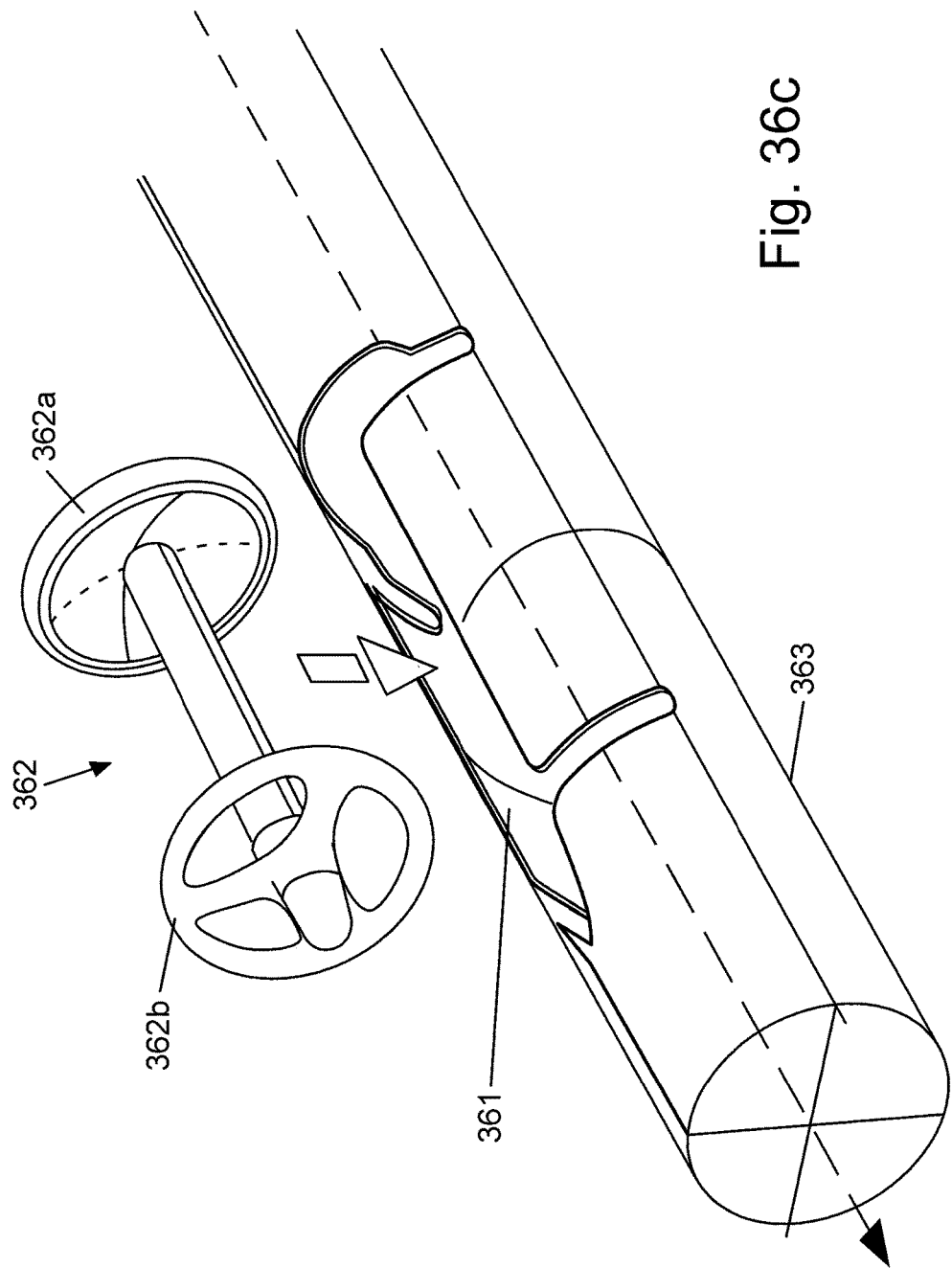

METHOD AND CONVEYOR DEVICE FOR CONVEYING BULK MATERIAL

BACKGROUND

1. Field of the Invention

The invention relates to a method and a conveying device for conveying bulk goods.

2. Description of the Background

Conveying devices of this kind, which are suitable for conveying bulk goods such as, for example, rice, flour, wheat or corn along i.a. curved pipes from an inlet for the bulk goods to an outlet for the bulk goods are known from the prior art as tube or pipe chain conveyors or retarding disk conveyors.

U.S. Pat. No. 4,197,938 discloses a conveying device for bulk goods comprising disk-like carriers. The carriers are arranged at a cable, wherein the cable comprising the carriers can be driven by means of a gear wheel for conveying the bulk goods i.a. along curved pipe sections from an inlet to an outlet.

This known conveying device for bulk goods is disadvantageous in that, for example, when the carriers are damaged during operation, replacement thereof is laborious, thus leading to increased maintenance costs and reducing the mean throughput of bulk goods through the conveying device. Moreover, when a cable is used as pulling element with carriers mounted thereto, a length adaptation, for example, for decreasing or increasing the length of the conveying device is complex. Moreover, the known conveying device is disadvantageous in that a filling level of the conveying device cannot be adjusted.

NL 1025855 discloses a conveying device having a plurality of carriers comprising an electrically conducting and/or magnetic material.

SUMMARY

Therefore, it is an object of the present invention to avoid the disadvantages of the known subject-matter, in particular to provide a conveying device, a carrier and a feeding device as well as a method by means of which a reliable operation of the conveying device is possible with little maintenance being necessary, wherein the operation of the conveying device is cost-efficient. It is a further object to provide a feeding device for allowing an adjustability of a filling level of the conveying device. It is an additional object of the present invention to provide a method for upgrading and/or converting or refitting already installed conveying devices so that they can be easily maintained during operation and are cost-efficient.

These objects are achieved by a method and a conveying device according to the claims.

General Description of the Principle of a Conveying Device According to the Invention For example, the conveying device comprises a conveying channel. The conveying channel is formed in particular as a conveying pipe. At least one carrier is arranged in the conveying channel. In particular, at least two carriers are arranged in the conveying channel. The conveying device comprises at least one drive for driving the at least one carrier for conveying bulk goods along a conveying channel axis. The at least one carrier is loosely arranged in the conveying channel at least in some sections along the conveying channel axis.

In the meaning of the present application, a "conveying device" is understood to be a device for in particular continuously conveying bulk goods. In the meaning of the present application, a "continuous conveying" of bulk goods is in particular also understood to be a conveying of bulk goods in which the flow of bulk goods in the conveying channel is interrupted in some sections by carriers.

In the meaning of the present application, a "conveying channel" is understood to be a channel along the longitudinal axis of which bulk goods can be conveyed. For example, a conveying channel can be formed as an open groove or as a hollow body with circular, triangular, rectangular or square cross-section or any other cross-sectional shapes. In particular, the conveying channel is formed as a conveying pipe having a circular cross-section perpendicular with respect to the longitudinal axis of the conveying pipe. Further, the conveying channel is in particular formed as a circumferential closed loop.

In the meaning of the present application, "a conveying channel axis" is understood to be the longitudinal axis of the conveying channel along which, when being used as intended, the bulk goods are conveyed.

In the meaning of the present application, a "carrier" ("conveying element") is understood to be an element by means of which, when being used as intended, bulk goods can be conveyed substantially parallel with respect to the longitudinal axis of the conveying channel by positioning the carrier along the longitudinal axis. In particular, the carrier can be arranged in a hollow body such as, e.g., a conveying pipe, and can be positioned along the axis of the hollow body for conveying bulk goods along the axis of the hollow body.

In the meaning of the present application, the term "bulk goods" is understood to be grainy, floury or also fragmented goods which are present in pourable form and are in particular capable of flowing. In particular, bulk goods are understood to be rice, flour, grain, wheat, corn, flowing, powdery substances and any combinations thereof.

In the meaning of the present application, a "loose arrangement of a carrier at least in some sections along the conveying channel axis" is understood to be a carrier which is not directly connected to a drive in this section. In this section, such a carrier is only moved along the conveying channel axis by carriers arranged adjacently along the conveying channel axis and/or bulk goods being conveyed. For example, in a drive section, a force is exerted on a carrier substantially parallel with respect to the conveying channel axis, so that the carrier and bulk goods being in contact with it are positioned substantially parallel with respect to the conveying channel axis, wherein the carrier and/or the bulk goods are moved outside the drive section of the conveying device along the conveying channel axis.

In the meaning of the present application, the wording "A and/or B" is understood to mean the following possible combinations: A; B; A and B; A and no B; B and no A.

Designing the conveying device with at least one carrier being loosely arranged in the conveying channel is advantageous in that a replacement of an, e.g., damaged carrier is easily possible because the carrier is loosely arranged in the conveying channel. Hence, the maintenance effort is reduced and thus the operation of the conveying device becomes more cost-efficient. Moreover, an adaptation to different conveying channel lengths by removing or adding a carrier is advantageous.

In particular, the conveying channel is S-shaped in at least one side view. This is advantageous in that a place-saving arrangement of the conveying device in particular in only one floor is possible. In the prior art, normally two or three floors in which the conveying device is arranged are necessary in this regard.

At least in the drive area, the conveying channel, in particular the conveying pipe, can comprise steel or can be made of steel.

Preferably, the conveying channel is formed as a guide means along the conveying channel axis for the carrier.

In the meaning of the present application, a "guide means" is understood to be a means for limiting the movement of the carrier substantially perpendicularly with respect to the conveying channel axis.

This design of the conveying channel as a guide means for the carrier is advantageous in that the carrier can only make a slight movement perpendicularly with respect to the conveying channel axis, so that damage to the carrier during operation is minimized.

This design of the conveying channel as guide means can, e.g., be achieved in that the mean cross-section of the conveying channel along the conveying channel axis has substantially a shape being congruent to the mean cross-section of the carrier along the conveying channel axis so that the carrier can still be inserted in the conveying channel and has little play in a direction laterally with respect to the conveying channel axis.

Particularly preferably, the drive is realized such that at least in some sections a force can be exerted by the drive directly on the carrier substantially parallel with respect to the conveying channel axis. For this purpose, the carrier can have at least one drive surface on which said force can be exerted. Advantageously, the drive surface is elastic and can be made, e.g., of plastic or rubber or can be coated therewith. It can thus be achieved that between the drive and the carrier there is not only a punctiform contact but a linear or even planar contact. Moreover, the drive surface can comprise steel or can be made of steel.

In the meaning of the present application, the wording that "a force can be exerted directly" is understood such that the force is exerted by the drive on the respective carrier and not by further carriers arranged between the drive and the carrier and/or by bulk goods.

This design of the drive is advantageous in that the force can be transmitted to the carrier in a reliable manner even if the carriers are arranged in a loose manner.

Particularly preferably, at least in a drive section, the drive reaches into the conveying channel for exerting a force on a carrier arranged in the drive section in a manner substantially parallel with respect to the conveying channel axis.

This is advantageous in that the drive must be arranged only in a portion of the device, which facilitates maintenance of the conveying device and simplifies the structural design of the conveying device.

In particular, the overall length of the carriers arranged in the conveying channel is smaller than the length of the conveying channel axis. Preferably, the overall length of the carriers is larger than the length of the conveying channel axis minus the length of the at least one drive section.

This is advantageous in that the drive of the carriers in the conveying channel can be reliably guaranteed.

The "overall length" of the carriers is understood to be the effective longest elongation of a carrier along the conveying channel axis multiplied by the number of carriers arranged in the conveying channel. If the carriers have different designs, the "overall length" of the carriers is understood to be the sum of the effective longest extensions of the carriers along the conveying channel axis.

Preferably, the drive is configured such that a force can be exerted on the carrier substantially in the circumferential region of the carrier facing the inner wall of the conveying channel.

In the meaning of the present application, the wording that "a force can be exerted substantially in the circumferential region of the carrier facing the inner wall of the conveying channel" is understood such that the drive engages with the carrier by means of a drive means for exerting a force, wherein the drive means directly contacts a section in the circumferential direction of the carrier.

This design is advantageous in that the drive must engage with the conveying channel only in the area of the inner wall in order to achieve the drive effect, so that collisions of the drive with other parts of the carrier or also a compression of bulk goods is minimized.

Particularly preferably, the drive can be selected or is selected from the list of the following kinds of drives or any combinations thereof: chain drive, belt drive, coupler mechanism, gear drive, worm drive, magnet drive, servo drives, direct drives. The coupler mechanism can be realized, e.g., as four bar mechanism, in particular as straight line drive.

Drives of this kind are known to the person skilled in the art per se. Advantageously, the best suitable drive can be selected in accordance with the requirements as well as, e.g., the structural boundary conditions.

In particular, a coupler mechanism is used, which turned out to be particularly advantageous during operation.

When using a magnet drive, it is in particular necessary to select the material for the carrier such that the alternating magnetic fields generated by the magnet drive allow the carriers to be driven.

In a first preferred version, the drive comprises at least one carrier bolt by means of which at least in some sections a force can be exerted directly on the carrier substantially parallel with respect to the conveying channel axis, in particular on a drive surface of the carrier. The carrier bolt preferably extends in a vertical direction at least while a force is exerted on the carrier.

Advantageously, the drive of this first version is realized as a chain drive and comprises at least one pair of driving chains, wherein any one of two opposite ends of the carrier bolt is mounted to a respective drive chain of the pair of drive chains. In case the carrier bolts extend vertically, the drive then comprises at least one lower drive chain and at least one upper drive chain.

The drive can comprise only one single or a plurality of drive chain pairs with respective carrier bolts. In some embodiments of the first version, the carrier bolts are arranged laterally of the conveying channel. Preferably, the carrier bolts of a first drive chain pair are arranged at a first side of the conveying channel, and the carrier bolts of a second drive chain pair are arranged at a second side of the conveying channel opposite the first side. It is thus possible to prevent the carriers from becoming wedged together while the carrier bolts exert a force on them.

It is also preferable that the distance between two adjacent carrier bolts is substantially identical to the extension of the carriers along the conveying channel axis. This means that the distance between two adjacent carrier bolts is at least as large as the extension of the carriers along the conveying channel axis and at most 1.5 times, preferably at most 1.25 times and particularly preferably at most 1.1 times this extension. In this manner it can be achieved that while being driven, the carriers contact each other at least nearly and thus the distance between them is as small as possible. Preferably, the distance between two adjacent carrier bolts is larger than the extension of the carriers along the conveying channel axis, in particular the ratio of these values can be at least 1.01. It is thus possible to achieve a certain play so as to compensate for production tolerances and/or wear tolerances.

In a second preferred version, the drive is realized as a chain drive or belt drive and comprises at least one drive chain having at least one carrier projection. By means of this carrier projection, at least in some sections a force can be directly exertable on the carrier, in particular on a drive surface of the carrier, substantially parallel with respect to the conveying channel axis.

Also in the second version, the drive chain can be arranged laterally of the conveying channel. Only one single drive chain or also a plurality of drive chains can be present. For example, a first drive chain with carrier projections can be arranged at a first side of the conveying channel and a second drive chain with carrier projections can be arranged at a second side of the conveying channel opposite the first side. Also in this manner the carriers can be prevented from becoming wedged together while the carrier bolts exert a force on them.

It is also preferable that the distance between two adjacent carrier projections is substantially identical to the extension of the carriers along the conveying channel axis. This means that the distance between two adjacent carrier projections is at least as large as the extension of the carriers along the conveying channel axis and at most 1.5 times, preferably at most 1.25 times and particularly preferably at most 1.1 times this extension. In this manner it can also be achieved that while being driven, the carriers contact each other at least nearly and thus the distance between them is as small as possible. Preferably, the distance between two adjacent carrier projections is larger than the extension of the carriers along the conveying channel axis, in particular the ratio of these values can be at least 1.01. It is thus possible to achieve a certain play so as to compensate for production tolerances and/or wear tolerances.

In a third preferred version, the drive is realized as a worm drive and comprises at least one rotatable drive worm by the rotational movement of which at least in some sections a force can be exerted directly on the carrier, in particular on a drive surface of the carrier, substantially parallel with respect to the conveying channel axis. To this end, it is particularly preferred if the rotational axis of the drive worm extends substantially parallel with respect to the conveying channel axis.

Also in this third version only one single or also a plurality of rotary drive worms can be present. For example, a first drive worm can be arranged at a first side of the conveying channel, and a second drive worm can be arranged at a second side of the conveying channel opposite the first side.

It is also preferred that the extension of the carriers along the conveying channel axis is substantially an integer multiple of the pitch of the drive worm. This means that the ratio of the extension of the carriers along the conveying channel axis and the pitch of the drive worm is at most by 0.4, preferably at most by 0.2 and particularly preferably at most by 0.1 smaller than an integer, wherein this integer can be, e.g., 1, 2, 3, 4, 5 or 6. For example, said ratio might lie in the range of 3.6 to 4, preferably 3.8 to 4, and particularly preferably 3.9 to 4. Also in this manner it can be achieved that while being driven, the carriers contact each other at least nearly and thus the distance between them is as small as possible. It is also preferred that said ratio is at least by 0.01 smaller than the mentioned integer. It is thus possible to achieve a certain play so as to compensate for production tolerances and/or wear tolerances.

In case there are multiple drive chain pairs and/or drive chains and/or drive worms, they are preferably synchronized with each other. This is possible, for example, by means of a gear drive known per se, by means of which the driving force can be transferred from a motor to a plurality of or all drive chains and/or drive worms. By means of such a synchronization it can in particular be guaranteed that the carrier bolts described above extend in a vertical direction at least while a force is exerted on the carrier and that a plurality of carrier bolts, carrier projections or drive worms move at the same speed.

Preferably, the drive section has a length in the direction of the conveying channel axis which is at least twice, preferably at least three times the length of a carrier. It can thus be guaranteed that at any time at least one carrier is located completely in the drive section.

At least one guiding element can be present at an inner wall of the conveying channel, and the carrier can have a corresponding counter guiding element by means of which the carrier can be guided along the guiding element. Tilting or wedging of the carrier can thus be prevented. The guiding element can be realized, e.g., as a lateral guiding plate. Preferably, at least two and more preferably exactly two opposite lateral guiding plates are arranged at the inner wall of the conveying channel.

Alternatively, the carriers can be centered by means of the carrier bolts described above. The drive chain described above can be guided laterally and can thus take up lateral forces.

Particularly preferably, a force transmission between two carriers arranged adjacently in the conveying channel parallel with respect to the conveying channel axis can be achieved by a direct contact between the carriers and/or by bulk goods arranged between the carriers in the conveying channel.

This is advantageous because it is sufficient to arrange only one drive in a drive section, which makes the conveying device more cost efficient and facilitates its maintenance.
General Description of the Principle of a Conveying Element A further aspect relates to a carrier for conveying bulk goods in a conveying device as described above. The carrier comprises a carrier surface and an alignment means for aligning the mean surface perpendicular of the carrier surface at least in some sections substantially parallel with respect to the conveying channel axis.

In the meaning of the present application, a "carrier surface" of the carrier is understood to be the surface which substantially causes the bulk goods to be conveyed in the conveying device when the carrier is used as intended.

An "alignment means" is understood to be a means for aligning the carrier surface of the carrier in the conveying channel in such a manner that, when being used as intended, the carrier is suitable for conveying bulk goods. For example, this can be achieved by a corresponding dimensioning as a cylinder, by means of struts (shanks) arranged at the circumference of the carrier parallel with respect to the conveying axis, or by spaced-apart disks connected by a strut (shank).

In the meaning of the present application, the "mean surface perpendicular" of the carrier surface is understood to be the mean value of the surface perpendicular on the effective carrier surface which, when being used as intended, can come in contact with bulk goods. The alignment of the carrier surface by means of an alignment means substantially parallel with respect to the conveying channel axis is advantageous in that the carrier surface takes a desired position during operation and thus allows an efficient and cost-saving operation. Since the alignment means is arranged at the carrier itself, for example when a carrier is damaged, it is easily possible to replace said carrier because the carrier can be arranged loosely in the conveying channel, which facilitates maintenance.

Preferably, when the mean surface perpendicular of the carrier surface is aligned substantially parallel with respect to the conveying channel axis, the carrier surface covers the mean conveying channel cross-section to an amount being smaller than 100%. Preferably, the mean conveying channel cross-section is covered in the range of 50% to 99.9% and particularly preferably of 80% to 99.9%. In particular, the covering might lie in the range of 85% to 99.9%, optionally in the range of 90% to 99.8%, and further optionally of 92% to 97%. In particular, the covering is selected depending on the bulk goods to be conveyed.

In the meaning of the present application, the "mean conveying channel cross-section" is understood to be the mean value of the cross-sectional surfaces perpendicular to the conveying channel axis, through which bulk goods are conveyed when being used as intended.

The advantage thereof is an efficient conveying of bulk goods along the conveying channel, leading to a cost-efficient operation.

Particularly preferably, the alignment means is configured as at least a first surface element and a second surface element which are spaced from each other substantially parallel with respect to the conveying channel axis and arranged so as to be in operational contact with each other, wherein the mean surface perpendiculars of the surface elements are arranged substantially parallel with respect to the conveying channel axis.

The advantage thereof is a simple structural design of the carrier. Furthermore, this design has the advantages mentioned above in view of the alignment means.

For example, the carrier can thus be formed of two circular disks being spaced apart from each other parallel with respect to the conveying channel axis and being connected to each other by means of a strut (shank) which is also arranged substantially parallel with respect to the conveying channel axis.

The drive surface of the carrier can be arranged at one of the two surface elements. In particular, the carrier surface can be formed by a first side of one of the two circular disks, and the drive surface can be formed by a second side of this disk opposite the first side.

Particularly preferably, the surfaces enclosed by the circumference of the first surface element and the second surface element are formed substantially congruently when being projected parallel with respect to the mean surface perpendiculars.

In the meaning of the present application, the "surface enclosed by the circumference" of the first surface element and/or the second surface element is understood such that the outer envelopes of the first surface element and/or the second surface element can be mapped substantially congruently on each other when being arranged in a conveying channel. For example, two full-surface, circular disks being arranged parallel with respect to each other and having an identical diameter are formed substantially congruently with respect to surfaces arranged parallel with respect to each other. Also a circular, full-surface disk without openings is, when being arranged in a conveying pipe with circular cross-section, formed substantially congruently with respect to a surface element comprising radially arranged struts (shanks) with hollow spaces between the struts if the struts have the same radius as the circular, full-surface disk.

Forming the first surface element and the second surface element substantially congruently with respect to each other is advantageous in that the carrier has a simple structural design which further simplifies maintenance and reduces the costs of the carrier.

Preferably, the first surface element of the carrier facing the conveying direction of the bulk goods lets the bulk goods go through. In particular, the second surface element comprises the carrier surface. In particular, the second surface element is arranged at the side of the carrier facing away from the conveying direction.

In the meaning of the present application, the "conveying direction" is understood to be the direction in which the bulk goods are, on average, conveyed along the conveying channel in the conveying device, in particular in a section along the conveying channel.

In the meaning of the present application, the term "lets go through" for a surface element is understood such that the bulk goods to be conveyed are allowed to go through. For example, the ability that the bulk goods go through can be achieved by arranging sufficiently large openings for the bulk goods in the first surface element.

The ability of the first surface element, which is arranged in a manner spaced apart from the second surface element substantially parallel with respect to the conveying channel axis, to let bulk goods go through is advantageous in that the space between the surface elements can be used for conveying bulk goods, which increases the throughput and is thus more efficient in view of the costs.

Particularly preferably, the carrier comprises a spacer at the side facing the conveying direction and/or at the side facing away from the conveying direction. In particular, the spacer is an arm arranged substantially parallel with respect to the conveying channel axis. Moreover, the spacer is in particular formed at the end facing away from the carrier in a ball-shaped or dome-shaped manner.

In the meaning of the present application, the wording "ball-shaped or dome-shaped" is understood such that a ball or a dome is arranged at the end of the spacer facing away from the carrier. A dome is understood to be a flattened section of a ball.

The arrangement of at least one spacer at the carrier is advantageous in that a minimum distance for efficiently conveying bulk goods in the conveying channel can be achieved by means of structurally simple means, which reduces the maintenance efforts and makes the operation cost-saving and efficient. Arranging a ball-shaped or dome-shaped spacer is advantageous in that also in curved conveying channels the spacer functions reliably and the occurrence of high point loading is minimized, which reduces wear and thus the maintenance efforts.

At the side facing the conveying direction or at the side facing away from the conveying direction, the carrier particularly preferably comprises a recess which is formed such that the spacer can engage with the recess.

In particular, the recess is funnel-shaped and moreover in particular at least in some sections ball-shaped or at least in some sections parabolic.

This is advantageous in that also in curved areas of the conveying channel, a spacer can reliably engage with the recess, which makes the operation more reliable and reduces wear, leading to reduced maintenance efforts.

General Description of the Principle of a Feeding Device for Bulk Goods, for Example for a Conveying Device According to the Invention A further aspect relates to a feeding device for bulk goods into an inlet in a conveying device comprising a conveying channel having an inner wall. In particular, the feeding device is used together with a conveying device as described above and optionally with a carrier as described above. The bulk goods can be conveyed into the conveying device substantially by means of gravity. In particular, the feeding device is arranged in a substantially horizontal section of the conveying device. The inlet covers an angular range of the inner wall of greater than 0° to smaller than 180° and/or smaller than 0° to greater than −180° relative to the gravity direction. Preferably, the angular range is greater than 20° to smaller than 160° and/or smaller than −20° to greater than −160°. Particularly preferably, the angular range is greater than 45° to smaller than 150° and/or smaller than −45° to greater than −150°.

In the meaning of the present application, an "angle relative to the gravity direction" is understood such that the gravity direction defines an angle of 0° and a positive angle is measured in the clockwise direction relative to the gravity direction and a negative angle in the counterclockwise direction.

In the meaning of the present application, a "substantially horizontal section" is a section which is arranged substantially perpendicular with respect to the gravity direction.

In the meaning of the present application, an "angular region covering the inner wall" is understood such that the inlet into the conveying device covers an opening angle measured from the conveying channel axis, i.e. the center of the conveying channel. The angular range should be understood to be the mean angular range.

For example, the inlet is arranged at the side if the inlet is arranged in a substantially horizontal section of the conveying device.

Arranging the inlet in the described angular range is advantageous in that a filling height or filling level can be adjusted in the conveying channel depending on the requirements. The angular range can be selected advantageously depending on the bulk goods used.

For example, the angular range can be firmly adjusted. This is advantageous in that the angular range can be fixed to an optimum value, e.g., for bulk goods to be conveyed, which renders the operation of the conveying device more reliable.

The angular range is preferably adjustable, in particular by means of a slide.

For example, the slide can be arranged as a rotary slide and/or as a rotary sleeve at the conveying channel and/or at the feeding device.

The adjustability of the angular range is advantageous in that, depending on the requirements as to the conveying of the bulk goods as well as also depending on the bulk goods to be conveyed, the angular range is adjustable for adjusting the filling level in the conveying channel.

Particularly preferably, the conveying device comprises a redirecting portion for conveying the bulk goods to the inlet.

This is advantageous in that the bulk goods, which are stored, e.g., upstream in a storage container, can be conveyed through the redirecting portion to the conveying channel, wherein the conveying speed or conveying rate of the bulk goods into the conveying channel can be adjusted by the redirecting portion.

In the meaning of the present application, a "redirecting portion" is understood to be a portion in which the bulk goods are redirected from a conveying direction substantially parallel with respect to the gravity direction.

Particularly preferably, the redirecting portion is formed as a redirecting surface and arranged at a redirecting angle relative to the gravity direction in the range of 30° to 70°.

Preferably, the redirecting angle lies in the range of 40° to 60°, particularly preferably of 45° to 55°.

Alternatively, the redirecting angle can also be −30° to −70°, preferably −40° to −60° and particularly preferably −45° to −55°.

Arranging a redirecting surface in the described angular range is advantageous in that the amount of supplied bulk goods can be adjusted depending on the bulk goods used and the required flow rate.

In particular, the redirecting angle is adjustable, which advantageously allows the redirecting angle to be adjusted depending on the respective requirements.

General Description of the Principle of a Method for Conveying Bulk Goods by Means of a Conveying Device According to the Invention and/or at Least a Conveying Element Described Above An additional aspect of the present invention relates to a method for conveying bulk goods by means of a conveying device as described above. Optionally, the conveying device comprises a carrier as described above. Further optionally, the device comprises a feeding device as described above. The method comprises the step of conveying the bulk goods from an inlet to an outlet.

The method comprises the advantages described above.

General Description of the Principle of a Method for Upgrading and/or Converting or Refitting a Conveying Device According to the Invention A further aspect relates to a method for upgrading and/or converting or refitting a conveying device for conveying bulk goods. The method comprises the step of mounting at least one carrier in order to build a conveying device as described above. In particular, a carrier as described above is mounted. The method further optionally comprises the step of mounting a feeding device as described above.

This is advantageous in that already installed conveying devices can be upgraded and/or converted or refitted to become a conveying device according to the present invention, which is cost-efficient because no installation of a completely new conveying device is necessary.

Basic explanations, general definitions and particular features which have been described in a specific paragraph (e.g. with respect to the conveying device) in the present application also apply to other paragraphs (e.g. with respect to the conveying element) in this application.

BRIEF DESCRIPTION OF THE DRAWINGS

Further features and advantages of the invention will be discussed in more detail below on the basis of embodiments for a better understanding thereof, without the invention being restricted to the embodiments.

FIG. 13b shows a top view of a conveying device according to FIG. 13a;

FIG. 14b shows a top view of the conveying device according to FIG. 14a;

FIG. 15b shows a top view of the conveying device according to FIG. 15a;

FIG. 16b shows a top view of the conveying device according to FIG. 16a;

FIG. 17b shows a top view of the conveying device according to FIG. 17a;

FIG. 18b shows a top view of the conveying device according to FIG. 18a;

FIG. 19a shows a conveying device with a four bar mechanism at a first point in time;

FIG. 19b shows the conveying device according to FIG. 19a at a second point in time;

FIG. 36c shows a perspective view of a pipe cutout, e.g., as insertion opening for a conveying element together with a conveying element to be inserted.

DETAILED DESCRIPTION

In the following, first FIGS. 1 to 19 are described.

Figure 1:
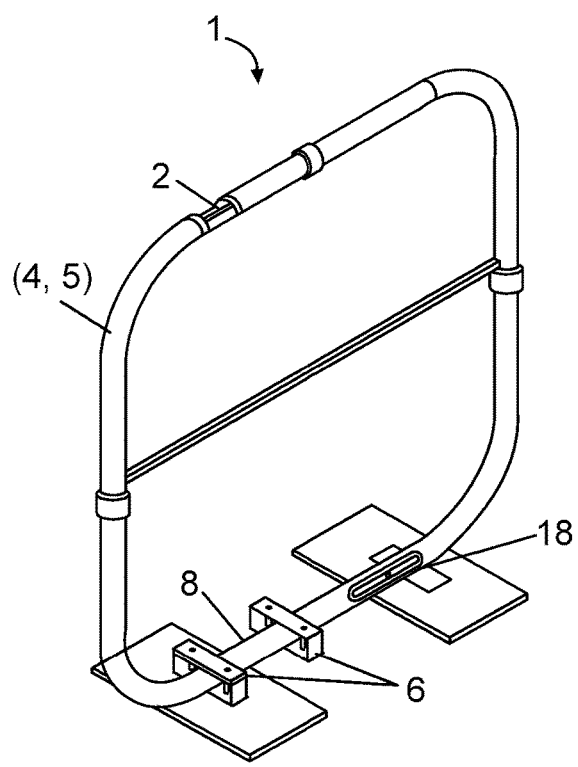
FIG. 1 shows a perspective view of a conveying device of the invention.

FIG. 1 shows a perspective view of a conveying device 1 of the invention for conveying bulk goods. The conveying channel 4 is formed as a conveying pipe 5, which can be made, e.g., of steel or plastic. The conveying channel 4 is formed in a circumferentially closed manner so that carriers (conveying elements) 2 arranged in the conveying channel 4 can rotate endlessly.

A plurality of carriers 2, which are driven by means of the drive 6 in the drive section 8, are arranged in the conveying device 1. The carriers are arranged loosely along the conveying channel axis in the conveying channel 4.

Bulk goods are conveyed by means of the feeding device 18 into the conveying channel 4.

Figure 2:
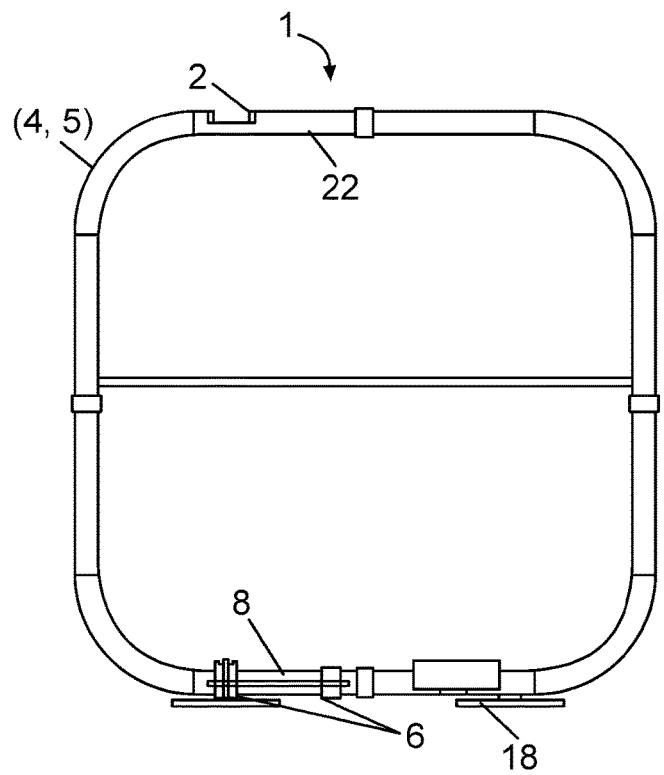
FIG. 2 shows a front view of the conveying device of the invention according to FIG. 1.

FIG. 2 shows a front view of the conveying device 1 according to FIG. 1.

In the following, equal reference numbers designate equal features in the Figures and, therefore, are only explained again if necessary.

In the illustration according to FIG. 2, an outlet 22 is shown. During operation, bulk goods are conveyed by the feeding device 18 into the conveying channel 4. The bulk goods in the conveying channel 4 are conveyed by the driven carriers 2 to the outlet 22 where the bulk goods fall out of the conveying device 1, e.g., into a collecting container not shown here.

Figure 3:
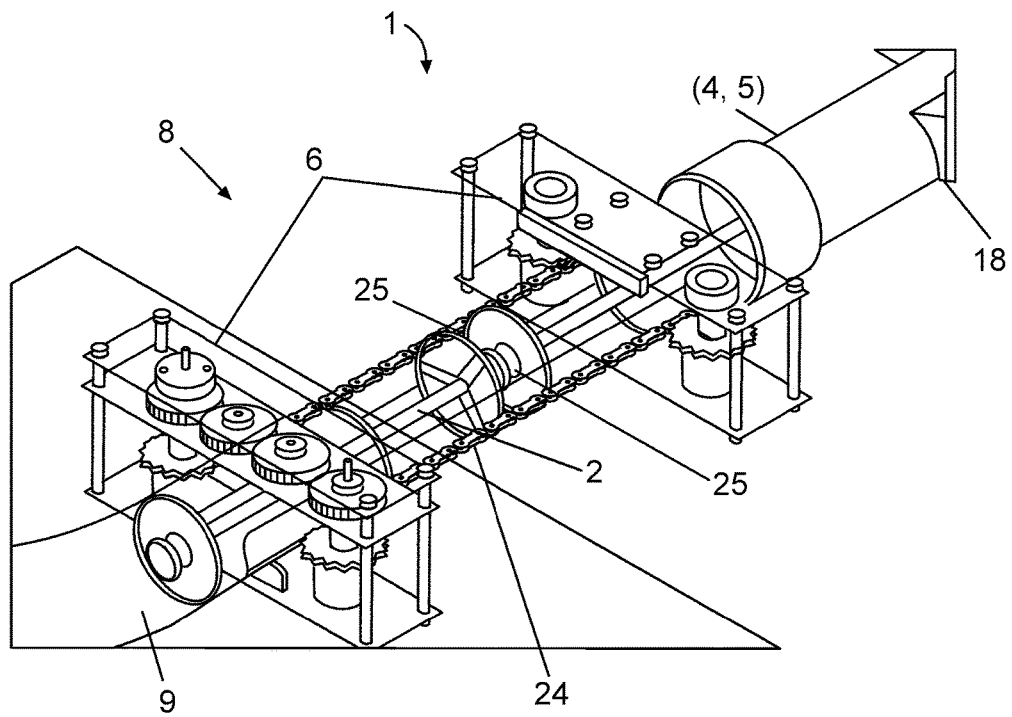
FIG. 3 shows an enlarged view of the drive section of the conveying device of the invention according to FIG. 1.

FIG. 3 shows a perspective view of the area comprising the drive section 8 of the conveying device 1 according to FIG. 1. The conveying pipe 5 has an inner wall 9 which acts as a guiding means along the conveying channel axis for the carrier 2.

In the drive section 8, drive arms 25 exert a force on the carriers 2 in a manner substantially parallel with respect to the conveying channel axis. The drive arms 25 are moved by a drive chain 24 in the drive section 8 substantially parallel with respect to the conveying channel axis. The force is applied to the carrier 2 substantially in the circumferential area of the carrier 2 facing the inner wall 9 of the conveying channel.

Figure 4:
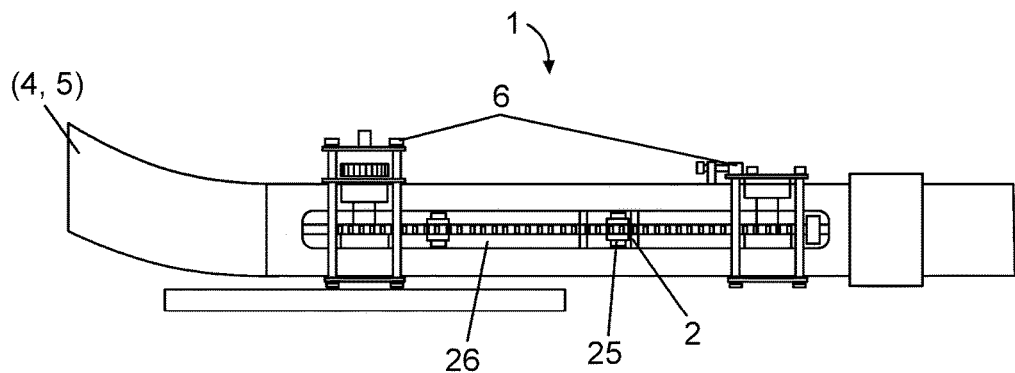
FIG. 4 shows a front view of a section of the conveying device of the invention according to FIG. 1 and comprising the drive section.

FIG. 4 shows a front view of a part of the section of the conveying device 1 according to FIG. 3.

The drive arms 25, which are driven by the drive chain 24, engage with the conveying pipe 5 through an engagement opening 26. Since bulk goods are conveyed by means of the drive 6 only downstream of the drive section, sealing of the engagement opening 26 is not necessary in any case.

Figure 5:
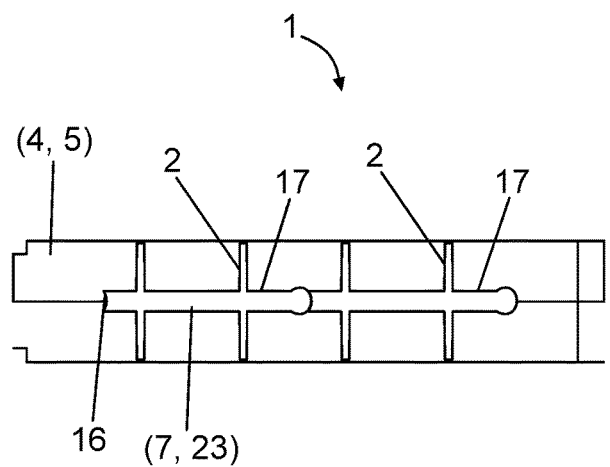
FIG. 5 shows a section of a conveying device of the invention comprising two carriers in a straight conveying pipe.

FIG. 5 schematically shows a section of the conveying channel 4 which is realized as a conveying pipe 5 and comprises two carriers 2. At the side of the carriers 2 facing the conveying direction, the carriers 2 have arms 17 serving as spacers. At the side facing away from the conveying direction, the carriers 2 have recesses 16 with which an adjacently arranged carrier 2 can optionally engage with the arm 17.

The carriers 2 comprise struts (shanks) 23 which, in the present case, are arranged substantially parallel with respect to the conveying channel axis 7.

Figure 6:
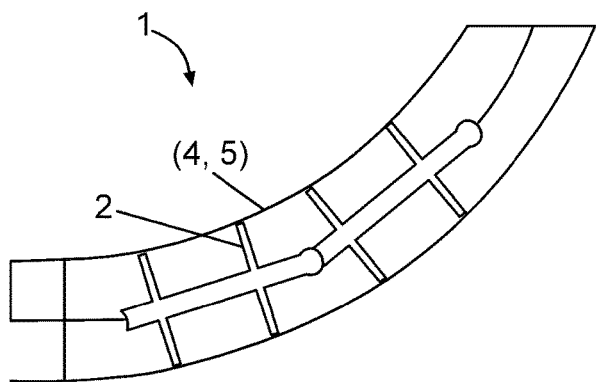
FIG. 6 shows a section of a conveying device of the invention comprising two carriers in a curved conveying channel.

FIG. 6 schematically shows a section of a conveying device having a curved conveying channel with carriers 2 arranged therein.

Figure 7:
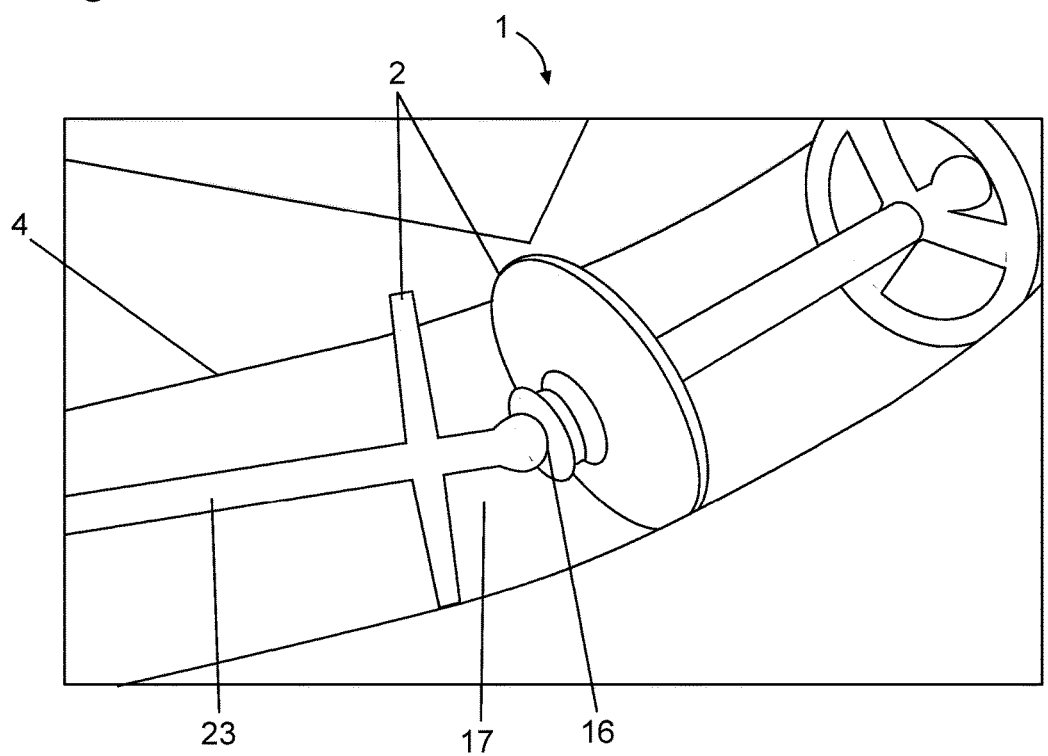
FIG. 7 shows a photographic view of two carriers of the invention being operationally connected in a conveying groove.

FIG. 7 photographically shows a section of a conveying device 1 with a conveying channel 4 which is realized as a conveying groove and in which two carriers 2 with arm 17 and recess 16 are shown in a curved section of the conveying channel.

Figure 8:
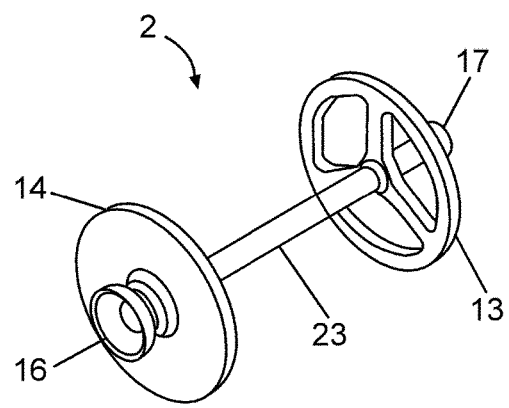
FIG. 8 shows a perspective view of a carrier of the invention.

FIG. 8 is a perspective view of a carrier 2 of the invention.

The carrier 2 according to FIG. 8 comprises an arm 17 which, when being used as intended, is arranged in a conveying channel at the side facing the conveying direction.

The carrier 2 comprises a first surface element 13 which lets bulk goods go through. The carrier 2 further comprises a second surface element 14 which comprises the carrier surface not shown here. The first surface element 13 and the second surface element 14 are arranged in a manner spaced apart from each other by means of a strut (shank) 23 in order to cause an operational connection between the two surface elements.

Moreover, at the side of the second surface element 14 facing away from the conveying direction, the carrier 2 has a recess 16 with which an arm 17 of an adjacently arranged carrier can engage.

Figure 9:
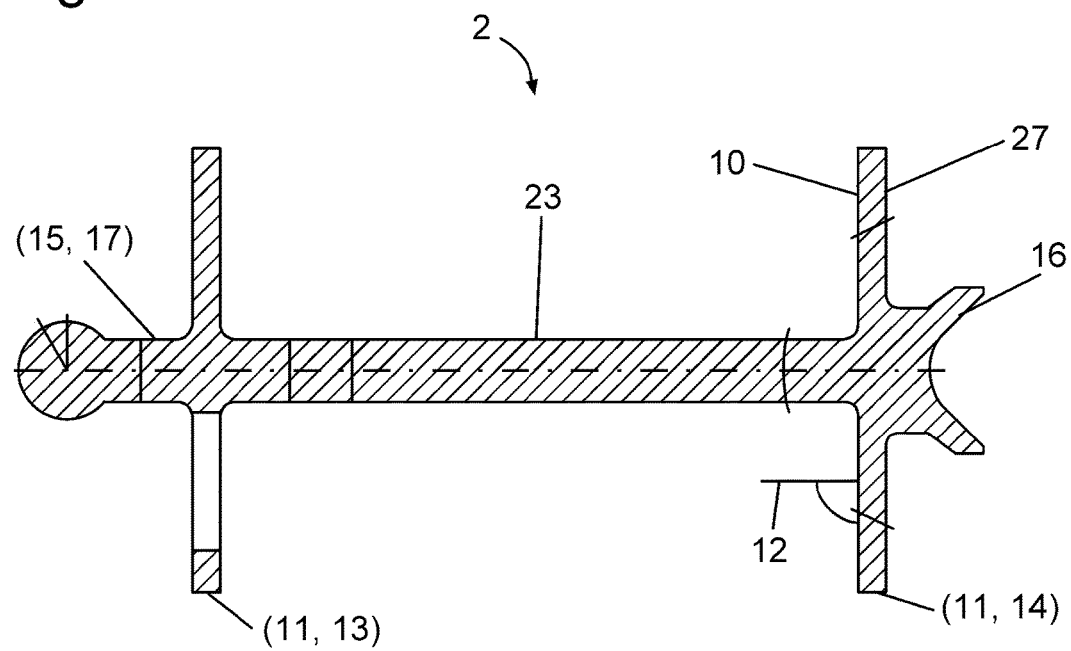
FIG. 9 shows a side view of the carrier according to FIG. 8.

FIG. 9 shows a side view of the carrier 2 of the invention according to FIG. 8.

The carrier 2 comprises a spacer 15 which is formed as an arm 17. The arm 17 is ball-shaped at the end facing away from the carrier 2. At the side facing away from the conveying direction, the carrier 2 has a recess 16 which is ball-shaped in some sections so that the ball-shaped spacer 15 can engage with the complementary recess 16 of a further carrier.

The first surface element 13 and the second surface element 14 are operatively connected to each other by means of the strut (shank) 23, wherein the first surface element 13 and the second surface element 14 act as alignment means 11. The first surface element 13 lets bulk goods go through.

The second surface element 14 comprises at a first side the carrier surface 10 for conveying the bulk goods along the conveying channel and at a second side opposite the first side it comprises a drive surface 27. The drive surface 27 can be elastic and made in particular of plastic or rubber. Alternatively, the drive surface 27 can also be made of steel. The drive can exert a force on this drive surface 27 for driving the carrier 2.

The surfaces enclosed by the circumferences of the first surface element 13 and the second surface element 14 are substantially congruent with respect to each other in case of a projection substantially parallel with respect to the mean surface perpendicular 12, which leads to the desired alignment of the carrier 2 in the conveying channel.

Figure 10:
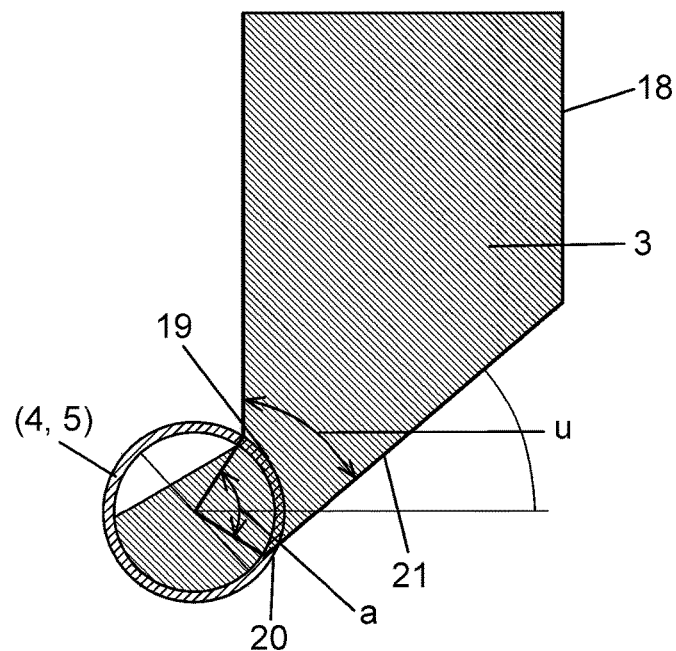
FIG. 10 shows a schematic view of a feeding device of the invention comprising a conveying channel.

FIG. 10 shows a side view of a feeding device 18 of the invention for feeding bulk goods 3 into a conveying pipe 5 of the conveying device.

The conveying pipe 5 has an inlet 19 covering an angular range a of about 90°. By means of a slide 20, which is realized as a rotary slide, the angular range a can be adjusted in accordance with the requirements.

The feeding device 18 has a redirecting area 21 which is arranged with a redirecting angle u of about 50° relative to the gravity direction.

Figure 11:
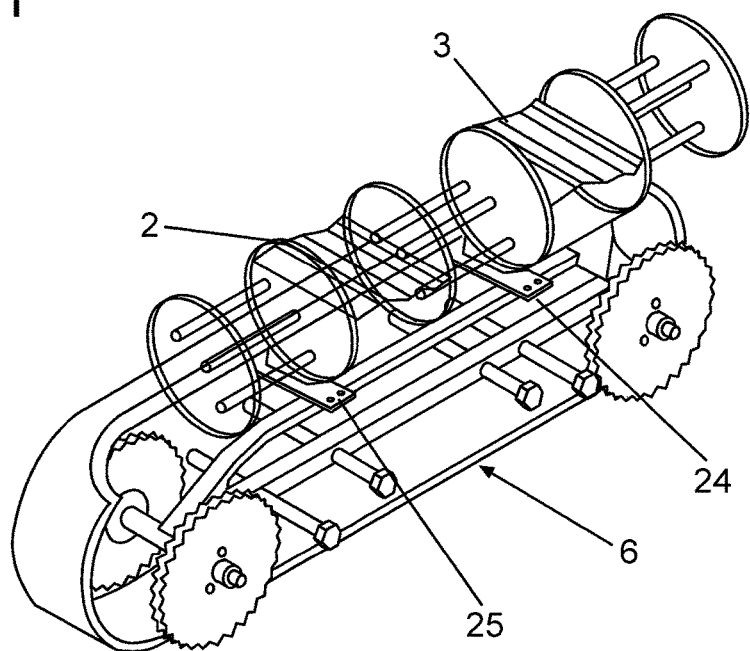
FIG. 11 shows a perspective view of a part of an alternative conveying device of the invention comprising carriers and bulk goods.

FIG. 11 shows a perspective view of a section of an alternative conveying device of the invention. For reasons of clarity, the conveying pipe is not shown here.

A plurality of carriers 2 are arranged in the conveying pipe, wherein in the present case three carriers 2 are visible. By means of a drive chain 24 (only sections thereof are shown) and driving arms 25 arranged thereon, a force can be exerted on the carriers 2 substantially parallel with respect to the conveying channel axis. The carriers 2 do not have spacers. Bulk goods 3 are arranged between the carriers 2, leading to the spacing of the carriers 2 desired in the present case.

Figure 12:
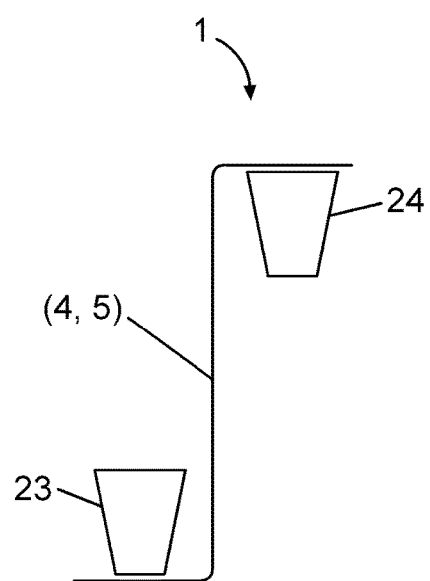
FIG. 12 shows a schematic view of a conveying device comprising an S-shaped conveying pipe.

FIG. 12 shows a schematic side view of a conveying device 1 with a conveying pipe 5. The conveying pipe 5 is S-shaped. In a lower region, an inlet container 23 is arranged for feeding bulk goods conveyed by means of carriers (not shown) to the outlet container 24. The inlet and the outlet are not shown here.

Figure 13A:
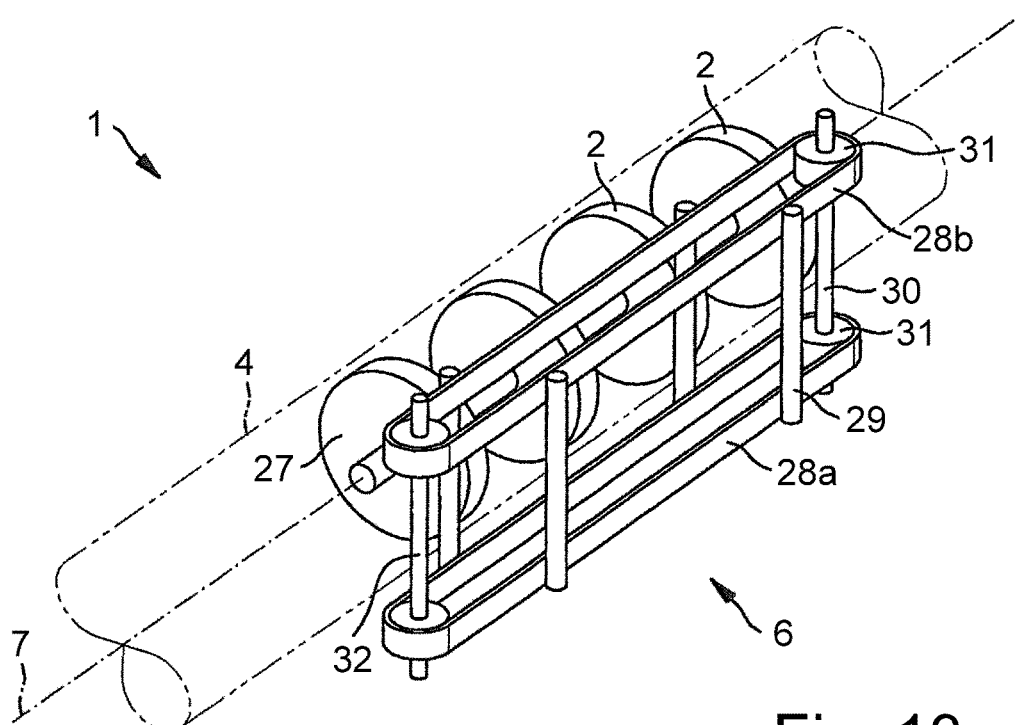
FIG. 13a shows a perspective view of a further embodiment of a conveying device of the invention comprising carrier bolts arranged at a pair of drive chains.
Figure 13B:
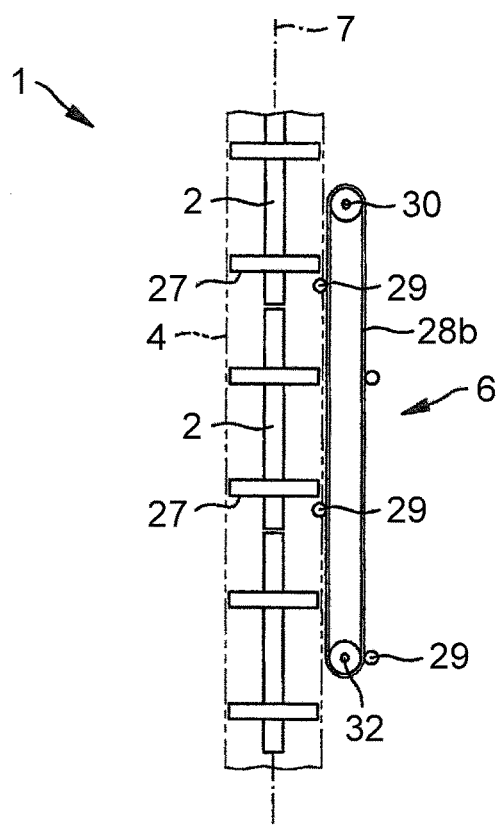

The conveying device 1 according to FIGS. 13a and 13b comprises a chain drive 6 with a pair of drive chains formed of a lower drive chain 28a and an upper drive chain 28b. Four carrier bolts 29 are attached to these drive chains 28a, 28b, wherein the respective lower ends of the carrier bolts 29 are attached to the lower drive chain 28a and the upper ends of the carrier bolts 29 are attached to the upper drive chain 28b. Hence, the carrier bolts 29 extend in a vertical direction. The two drive chains 28a, 28b are driven by means of a drive shaft 30 and two sprocket wheels 31 attached thereto. At the opposite end, the drive chains 28a, 28b are redirected by means of a redirecting axis 32. Also more or less than four carrier bolts 29 being attached to the drive chains 28a, 28b are conceivable.

By rotating the drive shaft 30, the carrier bolts 29 are moved along the conveying channel axis 7. Hence, the carrier bolts 29 come in contact with the drive surfaces 27 of the carriers 2 and thus drive them.

The distance between two adjacent carrier bolts 29 is approx. 1.02 times the extension of the carriers 2 along the conveying channel axis 7 and thus in the meaning of the above definition substantially identical to this extension. It can thus be achieved that the carriers 2 almost contact each other while being driven. However, contact is prevented in order to prevent undesired collisions of adjacent carriers 2. Moreover, the drive section along the conveying channel axis 7 is twice as long as the carriers 2. Hence, at any point in time at least one carrier 2 is completely in the drive section.

Figure 14A:
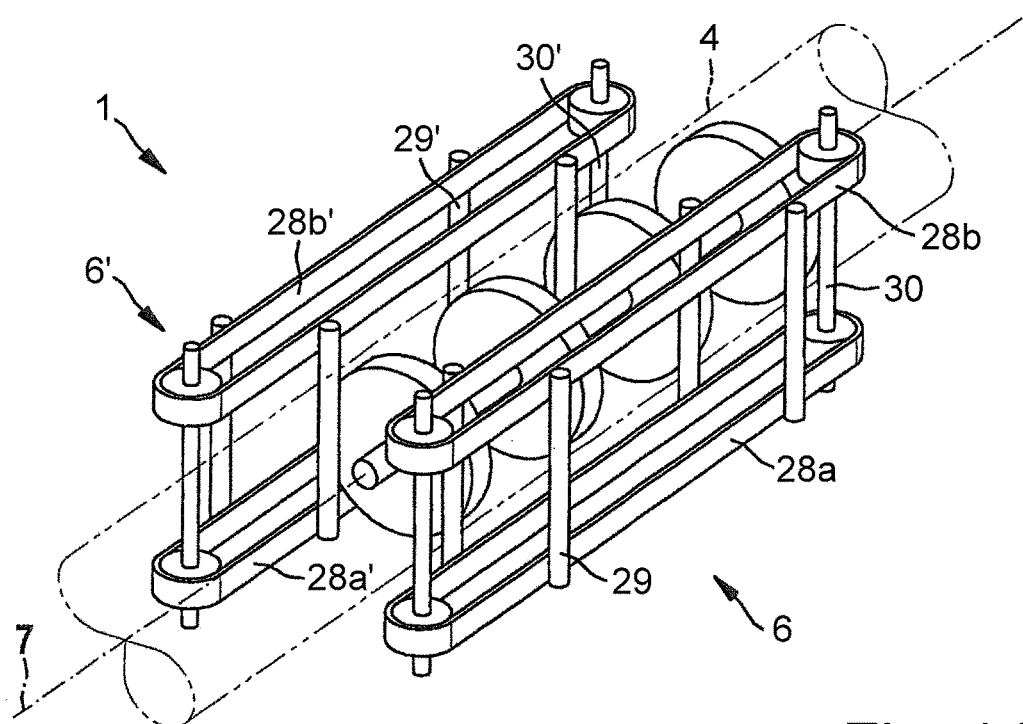
FIG. 14a shows a perspective view of a further embodiment of a conveying device of the invention comprising carrier bolts arranged at two pairs of drive chains.
Figure 14B:
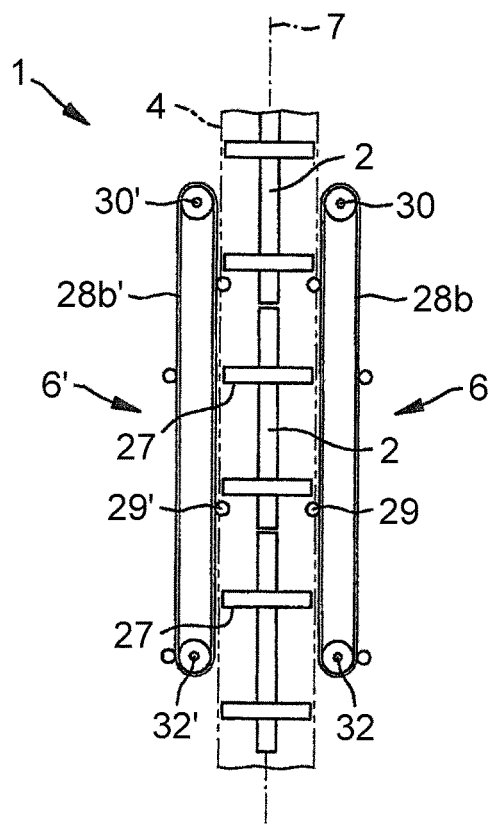

The embodiment shown in FIGS. 14a and 14b comprises two chain drives 6 and 6' with drive chain pairs 28a, 28b and 28a', 28b', which each have four respective carrier bolts 29 and 29'. The two drive chain pairs 28a, 28b and 28a', 28b' are arranged at opposite sides of the conveying channel 4. To allow a synchronous movement and a vertical alignment of the carrier bolts 29, 29', the two drive shafts 30, 30' can be driven by a common motor via a gear drive not shown here.

Figure 15A:
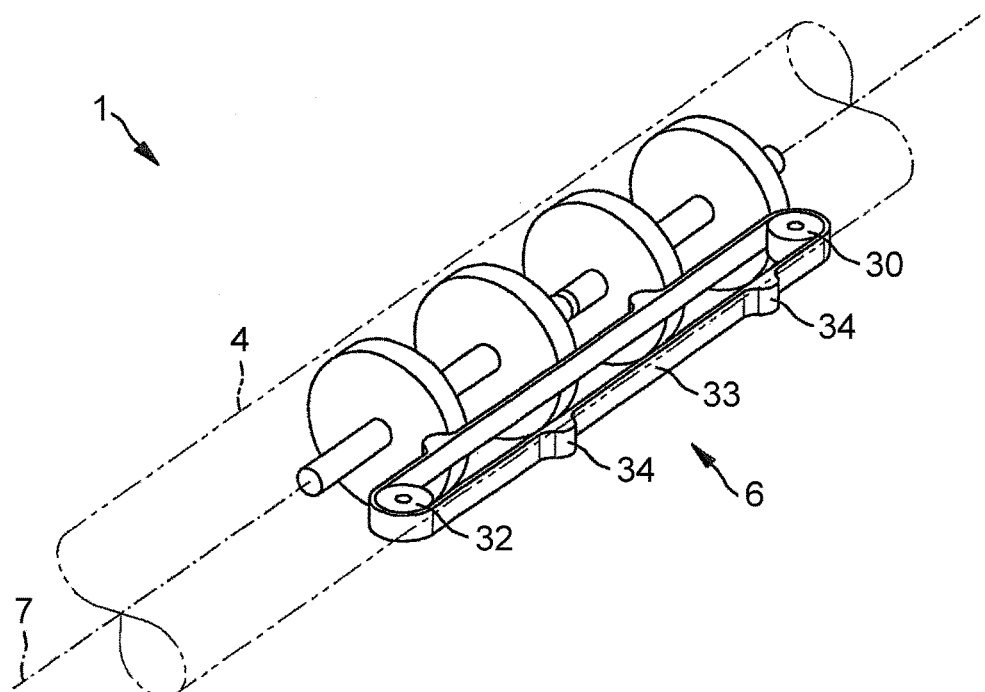
FIG. 15a shows a perspective view of a further embodiment of a conveying device of the invention with carrier projections arranged at a drive chain.
Figure 15B:
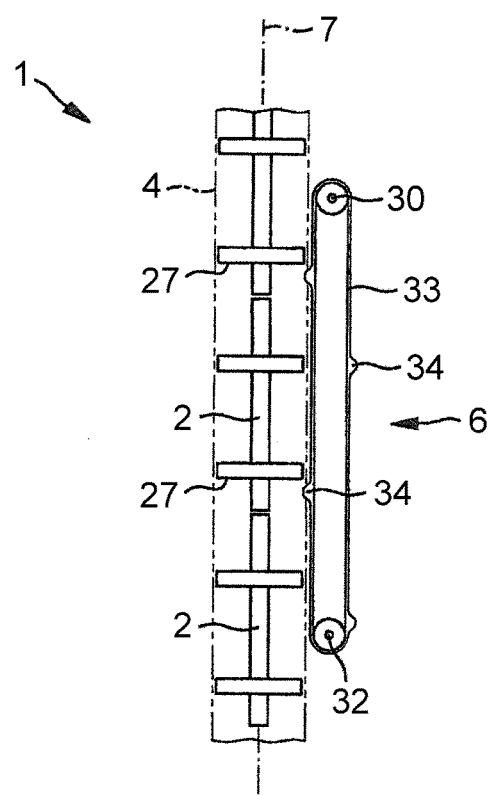

The chain drive 6 of the embodiment according to FIGS. 15a and 15b comprises a drive chain 33 which is driven by a drive shaft 30 and redirected by a redirecting axis 32. Four carrier projections 34, by means of which the carriers 2 can be driven, are screwed to the drive chain 33. The drive chain 33 is arranged laterally of the conveying channel 4.

The distance between two adjacent carrier projections 34 is approx. 1.02 times the extension of the carriers 2 along the conveying channel axis 7 and thus in the meaning of the above definition substantially identical to this extension. It can thus be achieved that the carriers 2 almost contact each other while being driven. Moreover, also in this example the drive section is twice as long as the carriers 2 along the conveying channel axis 7. Hence, at any point in time at least one carrier 2 is completely in the drive section.

Figure 16A:
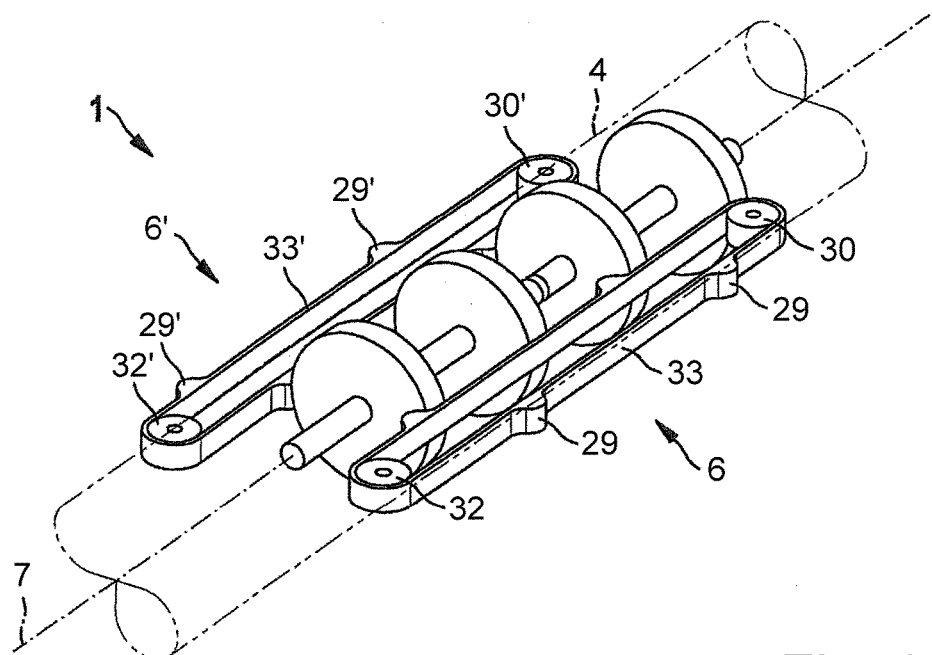
FIG. 16a shows a perspective view of a further embodiment of a conveying device of the invention with carrier projections arranged at two drive chains.
Figure 16B:
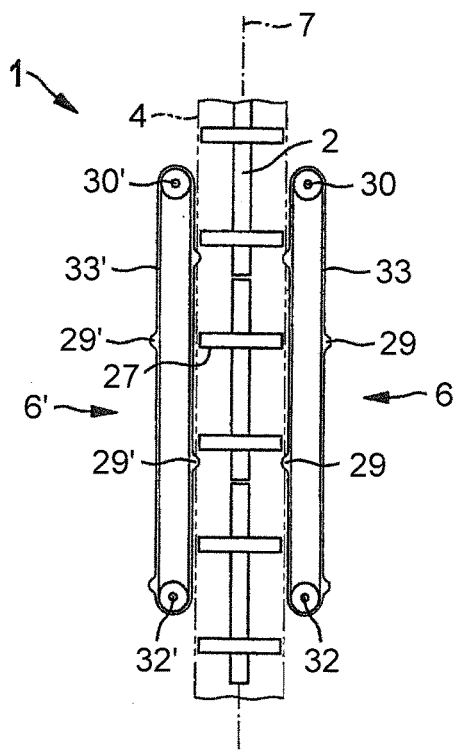

In contrast to FIGS. 15a and 15b, the conveying device 1 according to FIGS. 16a and 16b comprises two opposite drive chains 33, 33' with respective drive shafts 30 and 30' and respective redirecting axes 32 and 32' as well as respective carrier projections 34 and 34'. Also in this embodiment, the two drive shafts 30 and 30' can be synchronized by means of a gear drive not shown here.

Figure 17A:
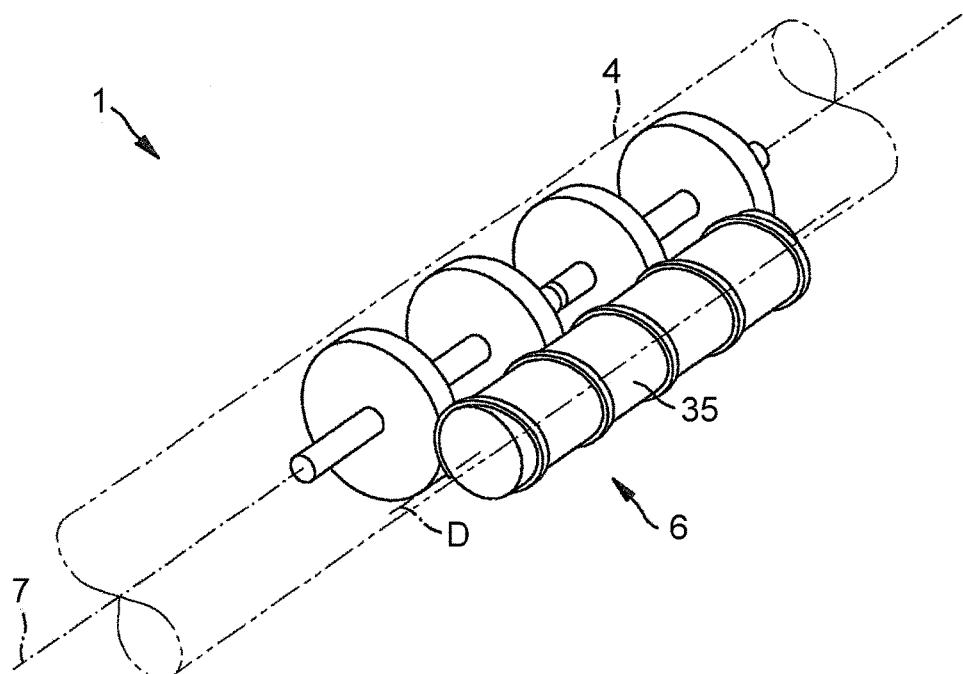
FIG. 17a shows a perspective view of a further embodiment of a conveying device of the invention with a drive worm.
Figure 17B:
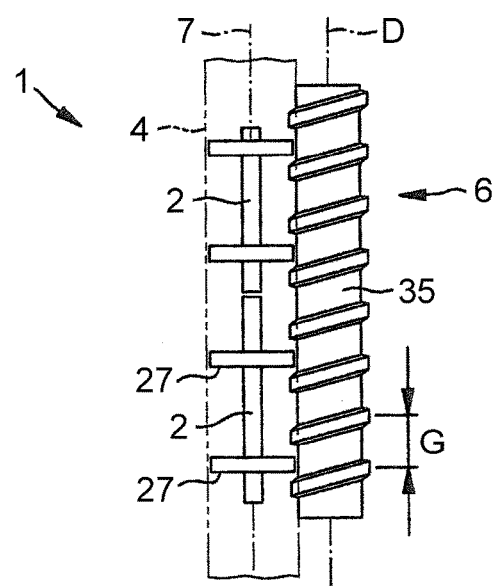

In the embodiment shown in FIGS. 17a and 17b, the drive is realized as a worm drive 6 with a rotary drive worm 35 whose rotational axis D extends parallel with respect to the conveying channel axis 7. In this embodiment, the carriers 2 are driven by rotating the drive worm 35 about its rotational axis D.

The extension of the carriers 2 along the conveying channel axis 7 is about 3.9 times the pitch G of the drive worm 35. It can thus be achieved that the carriers 2 almost contact each other while being driven.

Figure 18A:
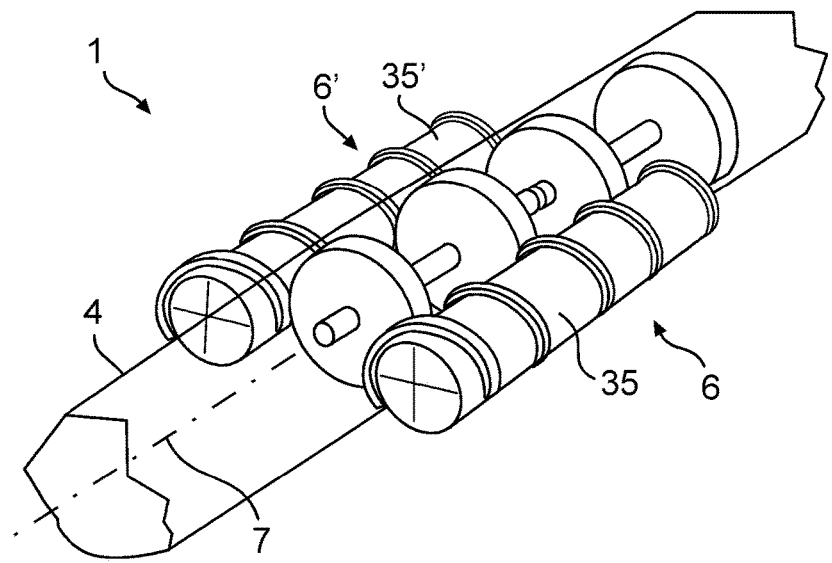
FIG. 18a shows a perspective view of a further embodiment of a conveying device of the invention with two drive worms.
Figure 18B:
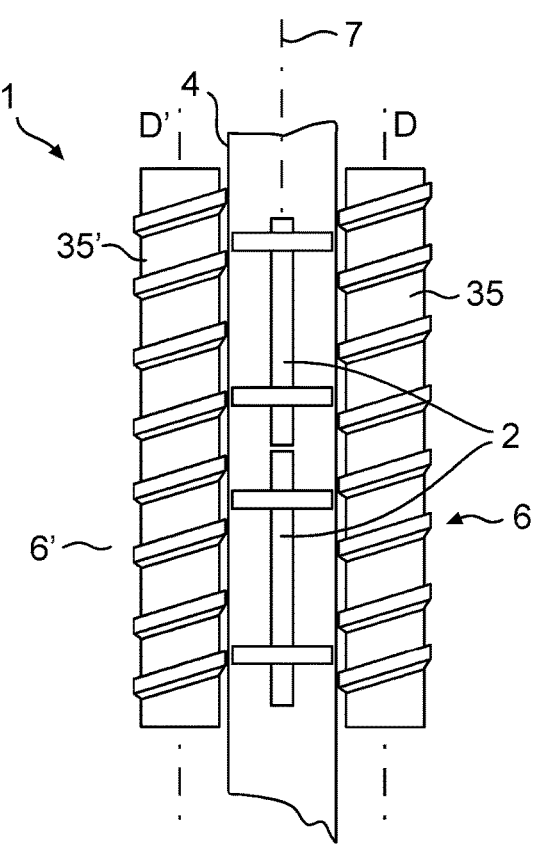

The embodiment shown in FIGS. 18a and 18b shows two drive worms 35, 35' with respective rotational axes D, D' extending parallel with respect to the conveying channel axis 7. Also here, the two drive worms 35, 35' can be synchronized by a gear drive not shown here.

FIGS. 19a and 19b show a drive 4 which is realized as a four bar mechanism. A first end of a first lever 36 is attached to a first drive shaft 37, while a second end of the first lever 36 is rotationally connected to a first end of a second lever 39 via a joint 38. The second lever 39 has a slot 40 with which a pin 41 engages so that it becomes possible to guide the second lever 39. Furthermore, a first end of a third lever 42 is attached to a second drive shaft 43, while a second end of the third lever 42 is rotationally connected to a first end of a fourth lever 45 via a joint 44. The fourth lever 45 has a slot 46 with which a pin 47 engages so that it becomes possible to guide the fourth lever 45. The first drive shaft 37 and the second drive shaft 43 are driven by a common drive belt 48 so that a synchronization of the drive shafts 37, 43 is achieved.

FIGS. 19a and 19b show the drive 6 at two different points in time. The drive 6 is configured and arranged such that in some sections a force can be exerted on carriers 2 parallel with respect to the conveying channel axis 7 by means of a second end 49 of the second lever 39 and a second end 50 of the fourth lever 45 when the drive 6 moves by movement of the drive belt 48. Moreover, the drive 6 is configured and arranged such that the second end 49 of the second lever 39 exerts a force on a first carrier 2 until the second end 50 of the fourth lever 45 starts to exert a force on a second carrier 2 and vice versa. In this embodiment, the drive section has the length of a carrier 2.

Alternatively to the embodiment shown in FIGS. 19a and 19b, the movement of levers can also be controlled by at least one connecting member, preferably at least two connecting members, which either guides the levers with perpendicularly movable carrier bolts directly across the carriers or is indirectly placed in the drive.

The present invention thus comprises at first, i.a., the following aspects:

1. A conveying device (1) comprising a conveying channel (4), in particular a conveying pipe (5), at least one carrier (2) arranged in the conveying channel (4), in particular at least two carriers (2), and at least one drive (6) for driving the at least one carrier (2) for conveying bulk goods (3) along a conveying channel axis (7), characterized in that the at least one carrier is loosely arranged in the conveying channel (4) at least in some sections along the conveying channel axis (7).

2. The conveying device (1) according to aspect 1, characterized in that the conveying channel (4) is formed as a guide means along the conveying channel axis (7) for the carrier (2).

3. The conveying device (1) according to aspect 1 or 2, characterized in that the drive (6) is configured such that at least in some sections a force can be exerted by the drive (6) directly on the carrier (2) substantially parallel with respect to the conveying channel axis (7).

4. The conveying device (1) according to any of aspects 1 to 3, characterized in that the drive (6) reaches into the conveying channel (4) at least in a drive section (8) for exerting a force substantially parallel with respect to the conveying channel axis (7) on a carrier (2) arranged in the drive section (8).

5. The conveying device (1) according to any of aspects 1 to 4, characterized in that the drive (6) can be selected or is selected from the list of the following kinds of drives or any combinations thereof: chain drive, belt drive, coupler mechanism, gear drive, worm drive, magnet drive, servo drives, direct drives.

6. The conveying device (1) according to any of aspects 3 to 5, characterized in that the drive (6) comprises at least one carrier bolt (29, 29') by means of which a force can be exerted at least in some sections directly on the carrier (2) substantially parallel with respect to the conveying channel axis (7).

7. The conveying device (1) according to aspect 6, characterized in that the drive is configured as a chain drive (6) and comprises at least one drive chain pair (28a, 28b; 28a', 28b'), wherein each of two opposite ends of the carrier bolt (29, 29') is attached to a respective drive chain (28a, 28b; 28a', 28b') of the drive chain pair (28a, 28b; 28a', 28b').

8. The conveying device (1) according to any of aspects 3 to 7, characterized in that the drive is configured as a chain drive (6) and comprises at least one drive chain (33, 33') having at least one carrier projection (34, 34') by means of which a force can be exerted at least in some sections directly on the carrier (2) substantially parallel with respect to the conveying channel axis (7).

9. The conveying device (1) according to any of aspects 3 to 8, characterized in that the drive is configured as a worm drive (6) and comprises at least one rotary drive worm (35, 35') by the rotational movement of which a force can be exerted at least in some sections directly on the carrier (2) substantially parallel with respect to the conveying channel axis (7).

10. The conveying device (1) according to any of the preceding aspects, characterized in that a force transmission between two carriers (2) adjacently arranged in the conveying channel (4) parallel with respect to the conveying channel axis (7) can be achieved by a direct contact between the carriers (2) and/or by bulk goods arranged between the carriers (2) in the conveying channel.

11. A carrier (2) for conveying bulk goods (3) in a conveying device (1) according to any of the preceding aspects, comprising a carrier surface (10), characterized in that the carrier (2) comprises an alignment means (11) for aligning the mean surface perpendicular (12) of the carrier surface (10) at least in some sections substantially parallel with respect to the conveying channel axis (7).

12. The carrier (2) according to aspect 11, characterized in that when aligning the mean surface perpendicular (12) of the carrier surface (10) substantially parallel with respect to the conveying channel axis (7), the carrier surface (10) covers the mean conveying channel cross-section to an extent of less than 100%, preferably in the range of 50% to 99.9% and particularly preferably of 80% to 99.9%.

13. The carrier (2) according to aspect 11 or 12, characterized in that the alignment means (11) is configured at least as a first surface element (13) and a second surface element (14) which are spaced from each other substantially parallel with respect to the conveying channel axis (7) and which are arranged so as to be operatively connected to each other, wherein the mean surface perpendiculars (12) of the surface elements are arranged substantially parallel with respect to the conveying channel axis (7).

14. The carrier (2) according to aspect 13, characterized in that the first surface element (13) facing the conveying direction of the bulk goods (3) lets the bulk goods (3) go through, wherein in particular the second surface element (14) comprises the carrier surface (10).

15. The carrier (2) according to any of aspects 11 to 14, characterized in that at the side facing and/or facing away from the conveying direction, the carrier (2) comprises a spacer (15), in particular an arm (17) arranged substantially parallel with respect to the conveying channel axis (7), which is in particular ball-shaped or dome-shaped at the end facing away from the carrier (2).

16. The carrier (2) according to aspect 15, characterized in that at the side facing or facing away from the conveying direction, the carrier (2) comprises a recess (16) which is formed such that the spacer (15) can engage with the recess (16), wherein the recess (16) is in particular funnel-shaped and wherein the recess (16) is preferably at least in sections ball-shaped and/or at least in sections parabolic.

17. A method for conveying bulk goods (3) by using a conveying device (1) according to any of aspects 1 to 10, optionally with a carrier (2) according to any of aspects 11 to 16, further optionally with a feeding device (18), comprising the step of conveying the bulk goods (3) from an inlet (19) to an outlet (22).

18. A method for upgrading and/or converting or refitting a conveying device (1) for conveying bulk goods (3), comprising the step of mounting at least one carrier (2), in particular a carrier (2) according to any of aspects 11 to 16, for building a conveying device (1) according to any of aspects 1 to 10, and optionally the step of mounting a feeding device (18).

For example also on the basis of the above basic explanations, general definitions and features as well as the explanations of the drawings, the present invention starts out from the basic idea that bulk goods are conveyed in a conveying channel, e.g. a conveying pipe, by conveying elements which are loosely arranged in the conveying channel and which are pushed or pressed in the conveying channel in the conveying direction and thus move the bulk goods through the conveying channel. The conveying elements are separate individual bodies or (bulk goods) carriers which, e.g., during the conveying of bulk goods in the conveying channel are (only) non-positively (in a form-fit or force-locked manner) connected to each other. For example, in the sections of the conveying channel in which there is no drive means, a conveying element moving in the conveying channel in the conveying direction can push or press a conveying element located downstream thereof through the conveying channel.

The basic concept in which the pressure of a conveying element is transferred to the conveying element being next in the conveying direction is characterized in view of known tube or pipe chain conveyors by its improved energy efficiency, increased conveying speed and performance, better hygiene and a smoother conveying of the bulk goods. In this connection, the increased energy efficiency is achieved, e.g., by a very low-friction transport as compared to tube or pipe chain conveyors. Moreover, it is possible that only one drive means is necessary, which is provided in particular in a first section of the conveying channel and thus does not come in contact with the bulk goods which are fed into the conveying channel only in a second section thereof. In accordance with the concept of the invention, it is additionally possible to provide a method and a conveying device which can be used for conveying different bulk goods such as rice, flour, grains, corn and wheat. For example, so far tube or pipe chain conveyors have been used for rice, bucket conveyors for flour, and elevator conveyors for grains, but they are excluded at least for transporting rice because of the explosion protection problems, the risk of accidents due to crushing and shearing points and due to lack of space and for cost reasons. On the other hand, the tube or pipe chain conveyors could meet the requirements for rice applications to some extent, but a tube or pipe chain conveyor is excluded for flour for hygiene reasons and for grains for reasons of the conveying performance. By means of the present invention, all these bulk goods can be conveyed easily and without problems, hygienically and highly efficiently.

The invention achieves the above-mentioned objects by means of the features of the claims.

The present invention relates to a conveying device and a method for conveying bulk goods by means of a conveying device comprising a conveying channel and at least two conveying elements being loosely arranged in the conveying channel. In a first section of the conveying channel, the conveying elements are mechanically driven in the conveying direction, i.e. via direct (touching) contact with a drive means.

In accordance with an embodiment, during the drive operation, a respective conveying element is in direct contact with at least one drive element via an opening in the first section of the conveying channel. In particular, a drive means is located substantially outside the conveying channel (or the conveying pipe, wherein the conveying pipe is closed across its cross-section in at least one section after feeding of the bulk goods) which, by means of its at least one drive element, can exert a direct force on the conveying elements through the opening in the first section of the conveying channel and thus pushes/presses the conveying elements in the conveying direction through the first section of the conveying channel.

For example, at least one conveying element as described above can have two disks and a shank which extends transversely thereto, connects the disks centrally and is aligned parallel with respect to the conveying direction at least in the first section of the conveying channel. The distance between the disks of the conveying element in the conveying direction can be larger (e.g., 1 mm to 5 mm larger, 2 mm to 3 mm larger, or in particular about 2 mm larger) than half the length of the conveying element in the conveying direction.

In accordance with an embodiment, the conveying elements are driven in the first section of the conveying channel by direct contact with one of the disks and/or both disks and/or the shank. In particular, while being driven, a drive element engages with the rear disk in the conveying direction (scraper disk comprising the carrier surface described above) of the conveying element and thus pushes the conveying element through the first section of the conveying channel.

In accordance with an embodiment, the conveying elements are driven in the transition area between the first and the second section of the conveying channel by direct contact with the rear disk in the conveying direction (scraper disk) of the conveying element. In this manner, the conveying element is pushed by the more stable scraper disk through the first section of the conveying channel. It can thus be avoided that the entire load of downstream conveying elements and bulk goods in the second and third sections of the conveying channel lies on the front disk (guide disk) that is weakened in particular by recesses.

In accordance with an embodiment, at least two drive elements are provided per length of a conveying element in the conveying direction via the opening in the first section of the conveying channel. For example, the drive means comprises the at least two drive elements, wherein the distance between the drive elements in the conveying direction corresponds to half the length of a conveying element.

Since not only one but two drive elements are provided for the drive of the conveying element per length of a conveying element, moreover an incorrect engagement of the drive elements and thus damage to the conveying element can be avoided. In particular, the distance between two drive elements is half the length of a conveying element in the conveying direction, while the distance between the scraper disk and the front disk (guide disk, which has, e.g., multiple recesses, as described above) of the conveying element is larger than half the length of the conveying element.

If the distance between two drive elements corresponds to the length of a conveying element, it is possible that a drive element engages incorrectly into the conveying element and thus, e.g., moves the conveying element at its conveying disk and just not at its scraper disk in the conveying channel in the conveying direction. Such an incorrect engagement can occur in particular if the length of the circumferentially closed guide channel is larger than the sum of the lengths of the individual conveying elements in the conveying channel. However, it can be advantageous that the sum of the lengths of the conveying elements is smaller than the length of the conveying channel for conveying, e.g., larger amounts of bulk goods. If, in this case, the conveying element came up to a downstream conveying element in a transition area between the first and the second section of the conveying pipe, the entire load of upstream conveying elements and bulk goods would be on the (weaker) guide disk so that the latter might be damaged or even destroyed.

If the distance between two drive elements corresponds to half the length of a conveying element, wherein the distance between scraper disk and guide disk of a conveying element is slightly larger than half the length of the conveying element, in the above case the drive element also pushes the guide disk in the first section of the conveying channel forward in the conveying direction. However, in the moment in which it encounters a downstream conveying element in a transition area between the first section and the second section, the conveying element slows down temporarily and the load changes from the drive element at the guide disk to the subsequent drive element which in this moment engages with the (stronger) scraper disk.

Thus, when a single conveying element enters, incorrect engagement can be avoided in the first section of the conveying channel (as compared to the non-positive connection between the conveying elements existing in the second and third sections of the conveying channel).

In accordance with an embodiment, the drive elements are the (carrier) bolts described above and/or the carrier projections and/or hydraulic elements and/or pneumatic elements described above. Two hydraulic elements and/or pneumatic elements arranged one behind the other in the conveying direction can be connected in such a manner that they alternatingly exert a force on the conveying element and/or simultaneously exert a force on the conveying element at different points (e.g. at the guide disk and at the scraper disk).

According to the invention, in a second section of the conveying channel, which preferably adjoins the first section of the conveying channel, bulk goods are fed into the conveying channel through a feeding opening, e.g. by a feeding device. By movement of the conveying elements, the bulk goods are then conveyed along the conveying direction in a third section of the conveying channel, wherein in this third section of the conveying channel, and in particular also in the second section of the conveying channel, the first conveying element is pressed or pushed by the second conveying element and/or the bulk goods through the conveying channel in the conveying direction. The bulk goods are conveyed, e.g., from a feeding opening for feeding the bulk goods into the conveying channel in the second section up to an outlet in the conveying channel at the end of the third section, wherein the conveying elements are pushed through the conveying channel by means of the drive in the first section and the non-positive connection between the conveying elements in the second and third sections. The non-positive connection is realized between the respective ends of the conveying elements in the conveying direction and, if applicable, via the fed bulk goods between these ends, so that conveying elements and bulk goods are pressed through the conveying channel.

The invention moreover relates to the conveying device with a conveying channel and at least two conveying elements which has already been described above i.a. in connection with the method and comprises the mechanical drive means for driving the conveying elements in the conveying direction in a first section of the conveying channel, wherein the conveying elements are loosely arranged in the conveying channel, and a feeding opening for feeding bulk goods into the conveying channel in a second section of the conveying channel. The conveying device is configured for carrying out the method described above, in particular in such a manner that in a third section of the conveying channel the first conveying element is pressed by the second conveying element and/or the bulk goods through the conveying channel in the conveying direction.

In accordance with an embodiment, the conveying channel has an opening in its second section through which the bulk goods can be fed into the conveying channel by a feeding device. This feeding opening is not rectangular (in particular when seen in a longitudinal section of the conveying channel). For example, the width of the feeding opening (or the length of the bow edge of the opening in the conveying pipe) can be smaller at the rearmost point of the feeding opening in the conveying direction than at any other point of the feeding opening.

Such a design of the feeding opening is advantageous in that abutting edges in pipe cutouts can be avoided. For example, openings in the conveying channel can be configured such that a shearing effect is caused in the openings when the conveying elements pass, so that the bulk goods are not destroyed and the conveying elements are not damaged. In particular if there are long cutout edges which are provided perpendicular with respect to the conveying direction, the conveying elements, mainly the disks, are subject to considerable wear, and the bulk goods to be conveyed readily fracture.

In accordance with an embodiment, the conveying channel has an opening for the drive, e.g., in the first section of the conveying channel and/or an outlet opening for removing the bulk goods, e.g., in or at the end of the third section of the conveying channel and/or one or more viewing openings (viewing windows) for inspections in one or more sections of the conveying channel and/or an insertion opening for the conveying elements upstream of and/or in the first section of the conveying channel or between the third and the first section of the conveying channel. For such openings the same principles apply as for the feeding opening described above, so that also in these openings abutting edges of pipe cutouts can be avoided as much as possible. With the described openings, which in particular do not have a rectangular shape, wear of the conveying elements is reduced: In rectangular cutouts there is a point load at the edges, while in the presently described and preferred embodiments, the load moves with the linear movement of the conveying element to different positions of the conveying element.

In accordance with an embodiment, the insertion opening for the conveying elements is configured, e.g., in accordance with the "poka yoke" principle in such a manner that only specific conveying elements can be inserted into the conveying channel and/or conveying elements can only be inserted in correct positional arrangement into the conveying channel. It can thus be prevented that, e.g., conveying elements which have an incorrect size or overall length or in which the distance between scraper disk and guide disk is not suitable for the drive are inserted into the conveying device and can cause malfunctions therein, in particular, e.g., if conveying elements are placed in the conveying channel contrary to the conveying direction. For example, the shape of the insertion opening in the conveying pipe wall can substantially correspond to the shape of the conveying element being projected in a correctly positioned manner onto the conveying pipe wall and/or can be only slightly larger for practical aspects in order to allow smooth insertion of the conveying element.

In accordance with an embodiment, at least one of the conveying elements is provided with a label for automatic identification and/or localization, and the conveying device comprises a reader for reading out the label. In particular, the label can be a code drawn/printed on the conveying element (e.g. a characterization providing a specific information) and/or an RFID transponder with a code which can be read out by the reader, e.g., at one or more places in/at the conveying channel, e.g., through a viewing window or another opening. In this manner, e.g., starting or stopping operations can be controlled, e.g., the conveying device can be configured such that it starts (only) when a (specific) conveying element has been identified at a specific place, and/or stops as soon as a (specific) conveying element has been moved to a specific place. For example, a well-defined number of cycles can thus be predefined in the conveying device.

In accordance with an embodiment, the conveying device, in particular the conveying channel is lockable. This can be advantageous, e.g., if it should be guaranteed in a specific manner that no contamination with other bulk goods, undesired contaminations or even poisons can enter the conveying device. For example, it can be provided for that the conveying device or the conveying channel is sealed, e.g., leaded at all sections having an opening in the channel wall (or the conveying pipe wall) to the means connected thereto. This can apply, e.g., to a drive means which engages with the conveying channel through a respective opening in the first section thereof, a feeding device by means of which the bulk goods should be fed through the feeding opening in the second section of the conveying channel following the first section, and an outlet device for the bulk goods which is arranged at the conveying channel over an outlet opening at the end of the third section following the second section or in a fourth section following the third section of the conveying channel. In particular, the conveying device can be configured such that the bulk goods are permanently in a locked system from a feeding device (with possibly upstream, sealingly connected, further devices) up to the outlet device and possibly further devices connected thereto in a sealed manner.

In the following, further features and advantages of the invention will be discussed in more detail for a better comprehension on the basis of embodiments in connection with FIGS. 20 to 36.

Similar to the embodiments in FIGS. 13 to 16, FIGS. 20 to 22 show perspective views of further embodiments with specific drive means.

Figure 20:
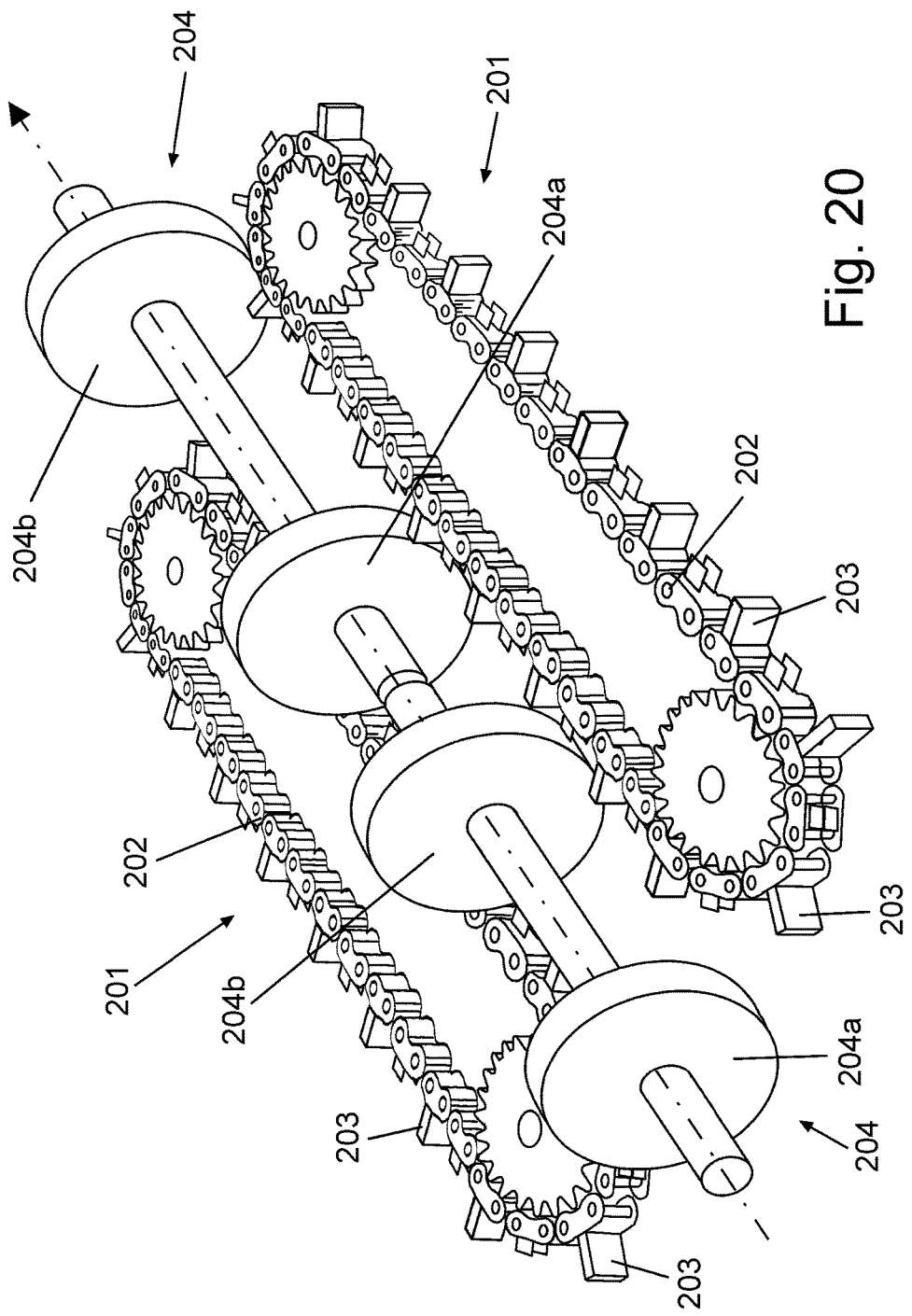
FIG. 20 shows a perspective view of a further embodiment of a conveying device of the invention comprising two drive chains.
Figure 21:
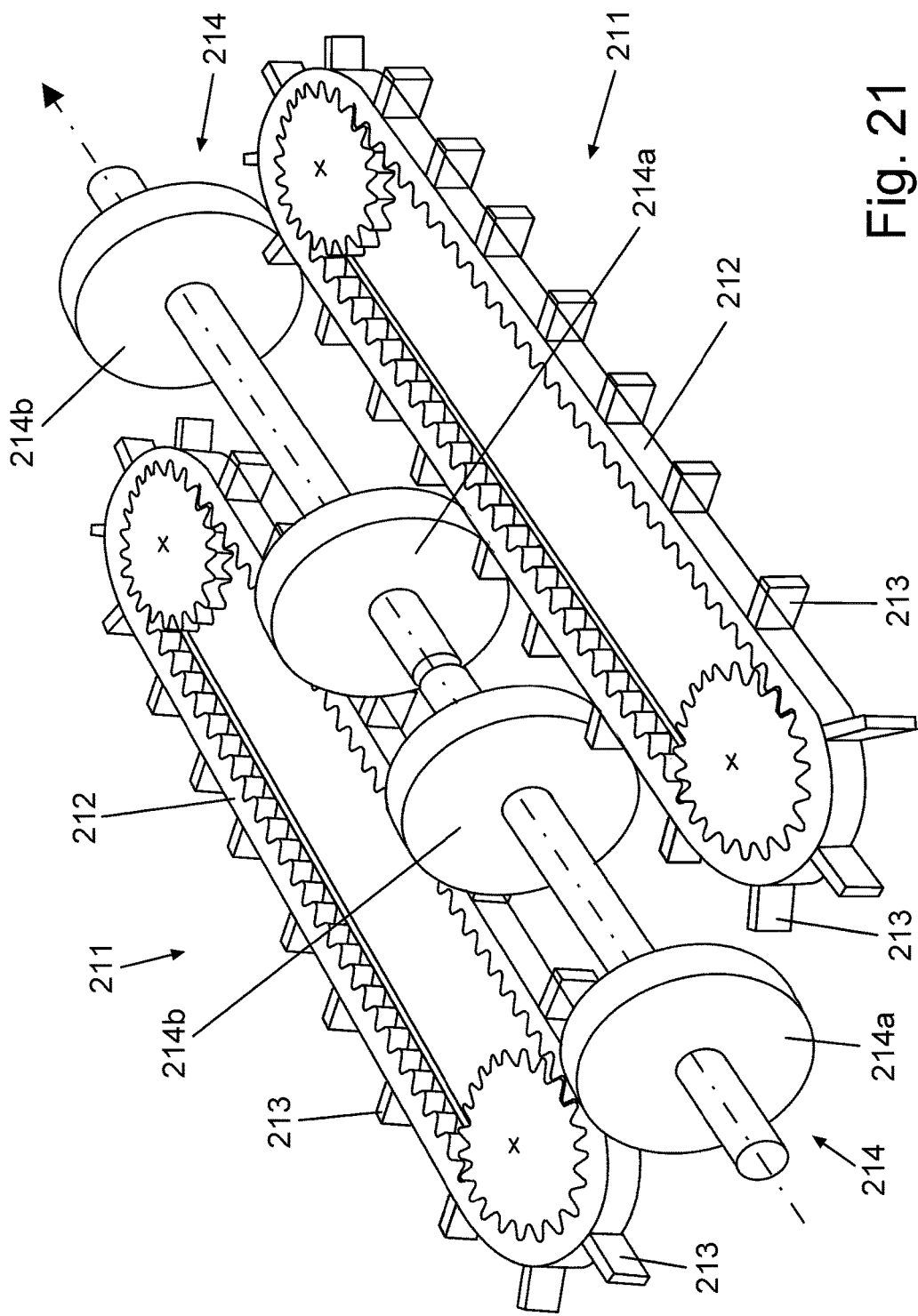
FIG. 21 shows a perspective view of a further embodiment of a conveying device of the invention comprising two drive belts.

FIGS. 20 and 21 show respective both-sided drive means 201, 211 with a respective drive chain 202, 212 in which multiple drive elements 203, 213 are provided which move the conveying elements 204, 214 in the conveying direction (see arrow) through the conveying channel. In contrast to the embodiments shown in FIGS. 13 to 16, in the embodiment according to FIGS. 20 and 21 the distance between two drive elements 203, 213 is smaller than the length of a conveying element 204, 214, e.g., about one third or about one fourth of the length of a conveying element 204, 214. In particular, the distance between two drive elements 203, 213 can be adapted to the distance between the scraper disk 204a, 214a and the guide disk 204b, 214b of the conveying element 204, 214 as well as to the overall length of the conveying element 204, 214 such that in case of a non-positive connection between the conveying element 204, 214 and a conveying element lying downstream thereof, the conveying element 204, 214 is driven in the conveying direction only by the scraper disk 204a, 214a.

Figure 22:
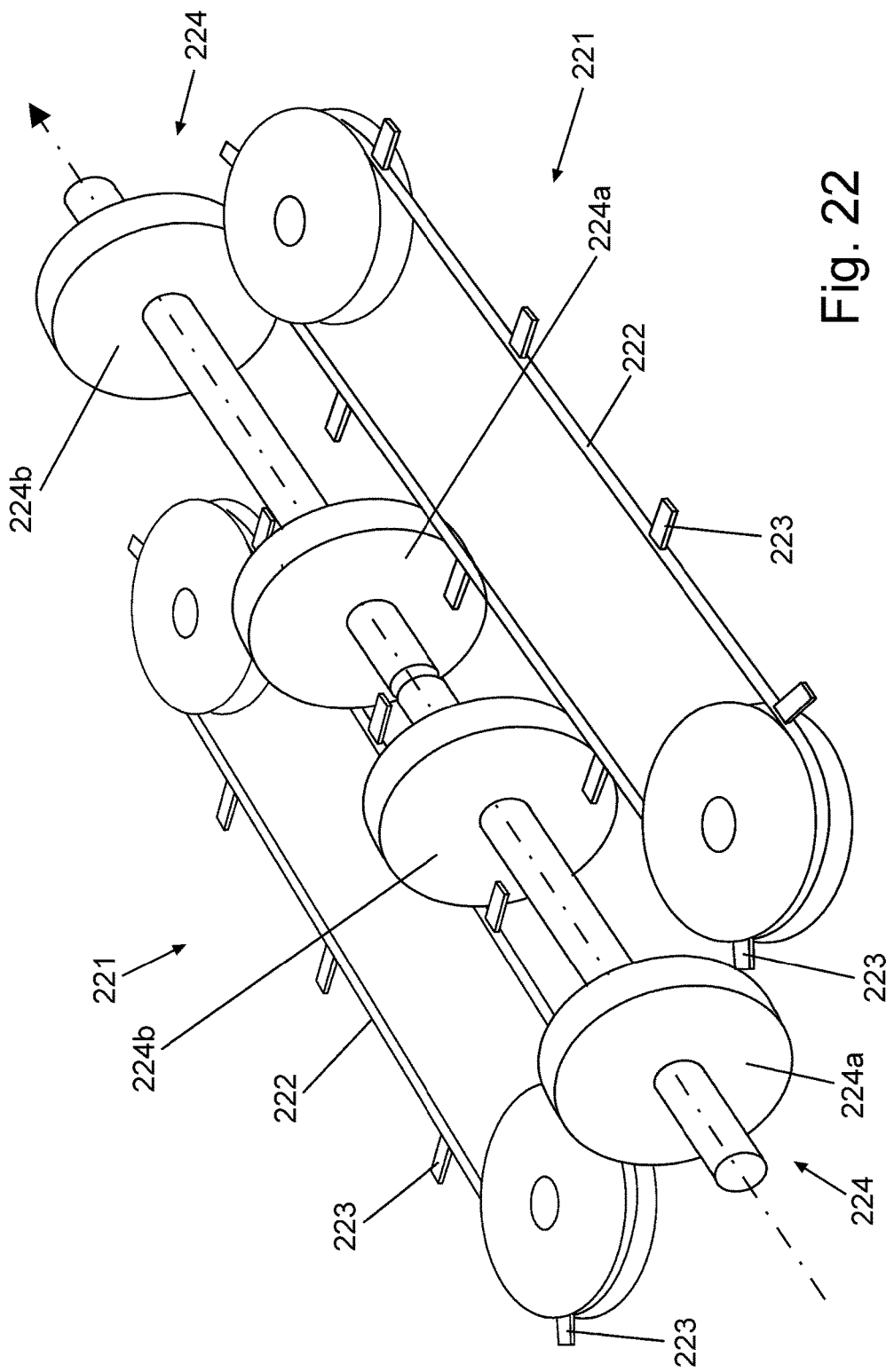
FIG. 22 shows a perspective view of a further embodiment of a conveying device of the invention comprising two drive belts.

Similar to the embodiments in FIGS. 20 and 21, FIG. 22 shows an embodiment of a drive means 221 with two drive belts 222 at which drive elements 223 are arranged whose distance is smaller than the length of a conveying element 224 in the conveying direction (see arrow). In particular, the distance of the drive elements 223 is in this case half the distance between the scraper disk 224a and the guide disk 224b of the conveying element 224. As already explained above, it is thus possible to prevent the entire load lying on the guide disk 224b of the conveying element 224 in case of an incorrect engagement of the drive, as soon as the conveying element comes up to a downstream conveying element.

According to an embodiment of the invention (e.g. also alternatively or also additionally to the drive means described above in general), pneumatic and/or hydraulic drives can be provided.

Figure 23:
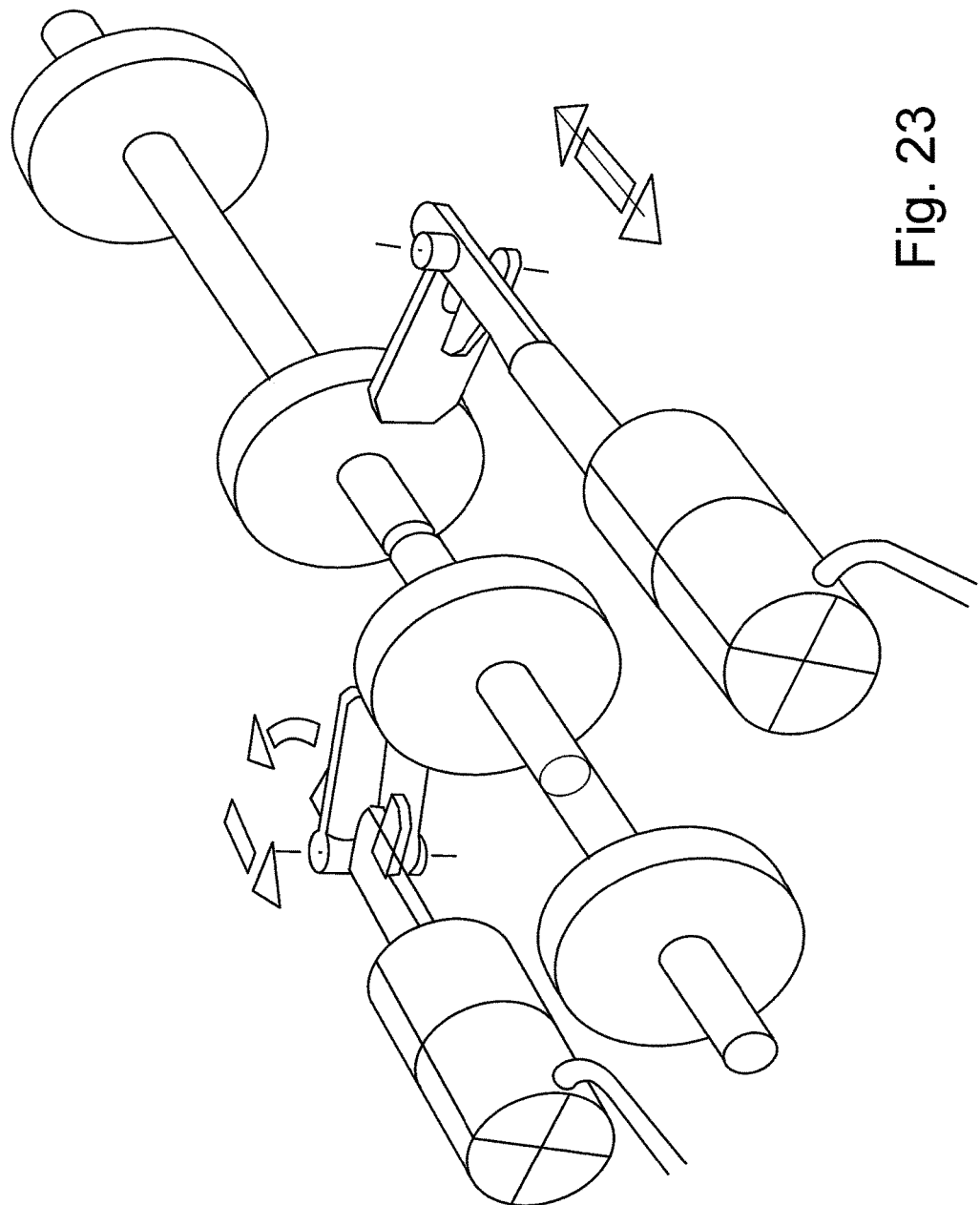
FIG. 23 shows a perspective view of a further embodiment of a conveying device of the invention, e.g., comprising two hydraulic elements.

FIG. 23 shows a drive means comprising two drive elements which are configured as pneumatic, hydraulic or engine-driven cylinders. By means of a stroke movement, the cylinders push the conveying element forwards, e.g., at the disk element. At the coupling point of the force introduction point between drive and disk element, e.g., a latch can be provided so that the return stroke can be made without contact with the conveying element in the return direction. In particular two (or four or six, etc.) drive elements of this kind are advantageous, so that one drive element is in the load stroke while the other drive element returns in the idle stroke.

Figure 24:
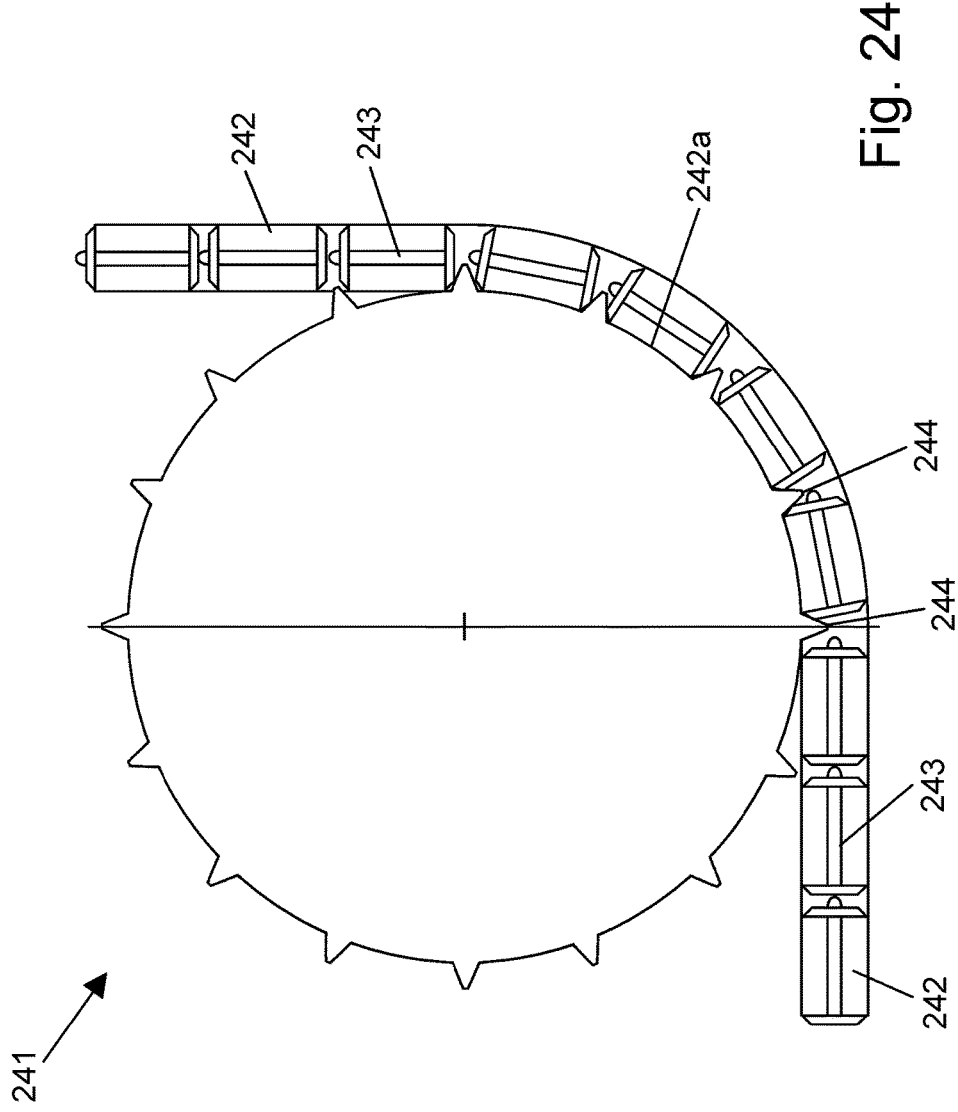
FIG. 24 shows a view of a further embodiment of a conveying device of the invention comprising a gear drive in an inner bow section of the conveying channel, in particular as intermediate drive.

FIG. 24 shows a gear drive 241 whose radius substantially corresponds to that of an inner bow section 242a of the conveying pipe 242. Thus, the conveying elements 243 can be pushed in the bow section through the conveying pipe 242. In accordance with an embodiment, a gear drive of this kind can be provided, e.g., as intermediate drive in the conveying device. In this case, the distance in the conveying direction between two adjacent teeth 244 of the gear drive can correspond to approx. the length of the conveying element 243.

Figure 25:
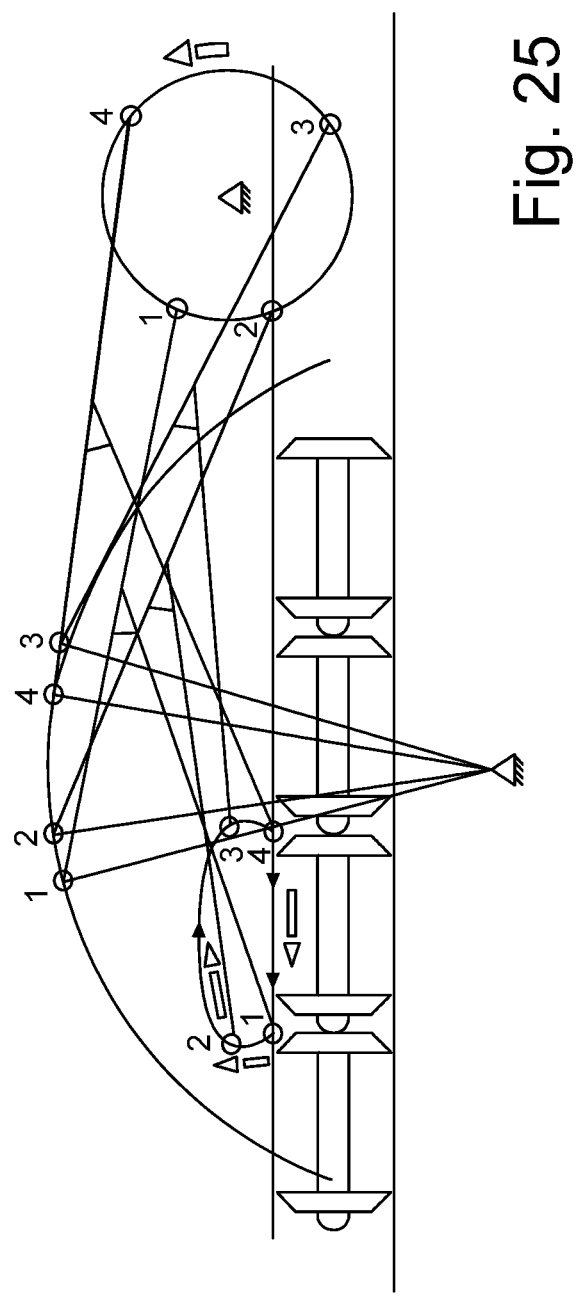
FIG. 25 shows a view of a further embodiment of a conveying device of the invention comprising a coupler mechanism.

FIG. 25 shows a view of a coupler mechanism, in particular a four-unit coupler mechanism in which a coupling point makes a straight-lined drive movement over a specific path, by means of which the mechanism can drive the conveying elements.

Figure 26A:
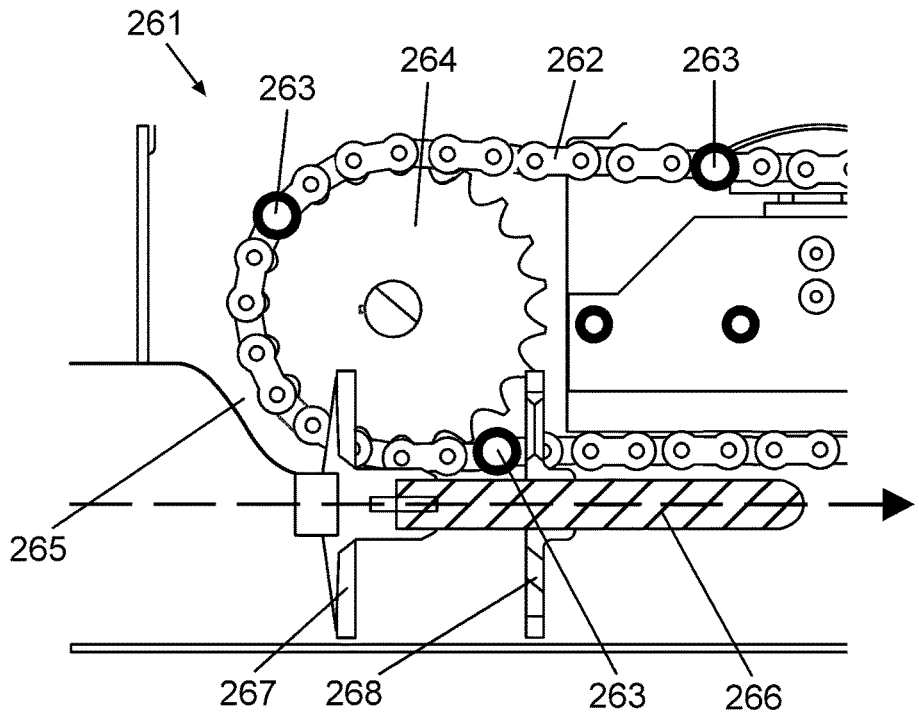
FIG. 26a shows a view of an embodiment of a mechanical drive.

FIG. 26a shows a mechanical drive means 261 comprising a drive chain 262 and drive elements (e.g. bolts) 263, which are guided by the drive chain 262 via a gear 264 through a drive opening 265 in a first section 265 of the conveying pipe. In FIG. 26a, one of the bolts 263 does not engage with the conveying element 266 at its scraping disk 267 because of an incorrect engagement but engages with its guide disk 268 and thus pushes the conveying element 266 through the first section 265 of the conveying pipe through direct force application to the guide disk 268. However, as soon as the conveying element 266 comes up to a downstream conveying element, the entire load of the upstream conveying elements and the bulk goods to be conveyed is on the guide disk 268 of the conveying element 266 so that the latter might be damaged or even destroyed.

Figure 26B:
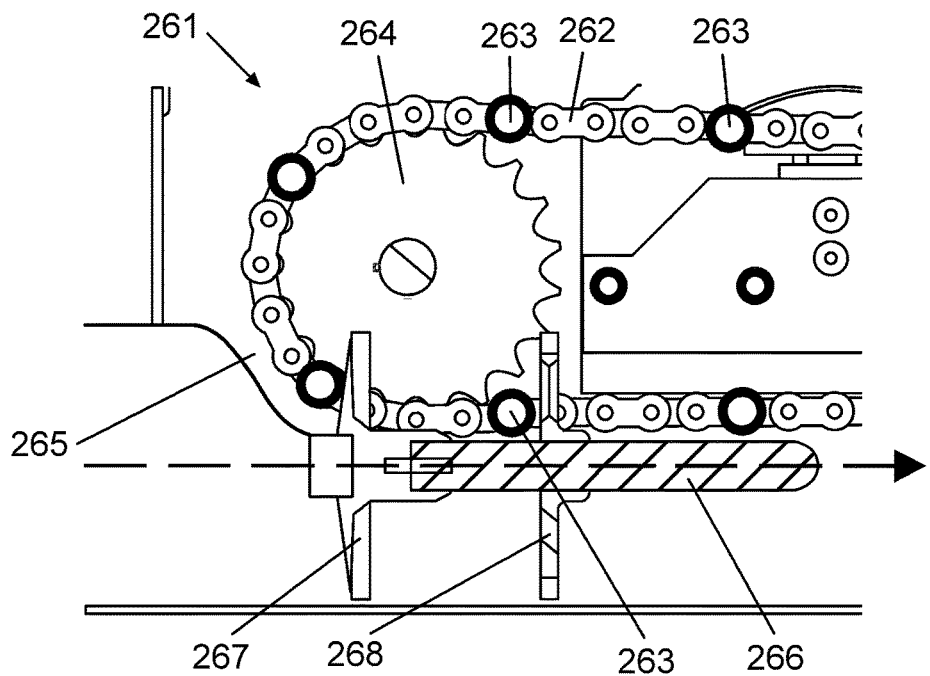
FIG. 26b shows a detailed view of a further embodiment of a mechanical drive.
Figure 26C:
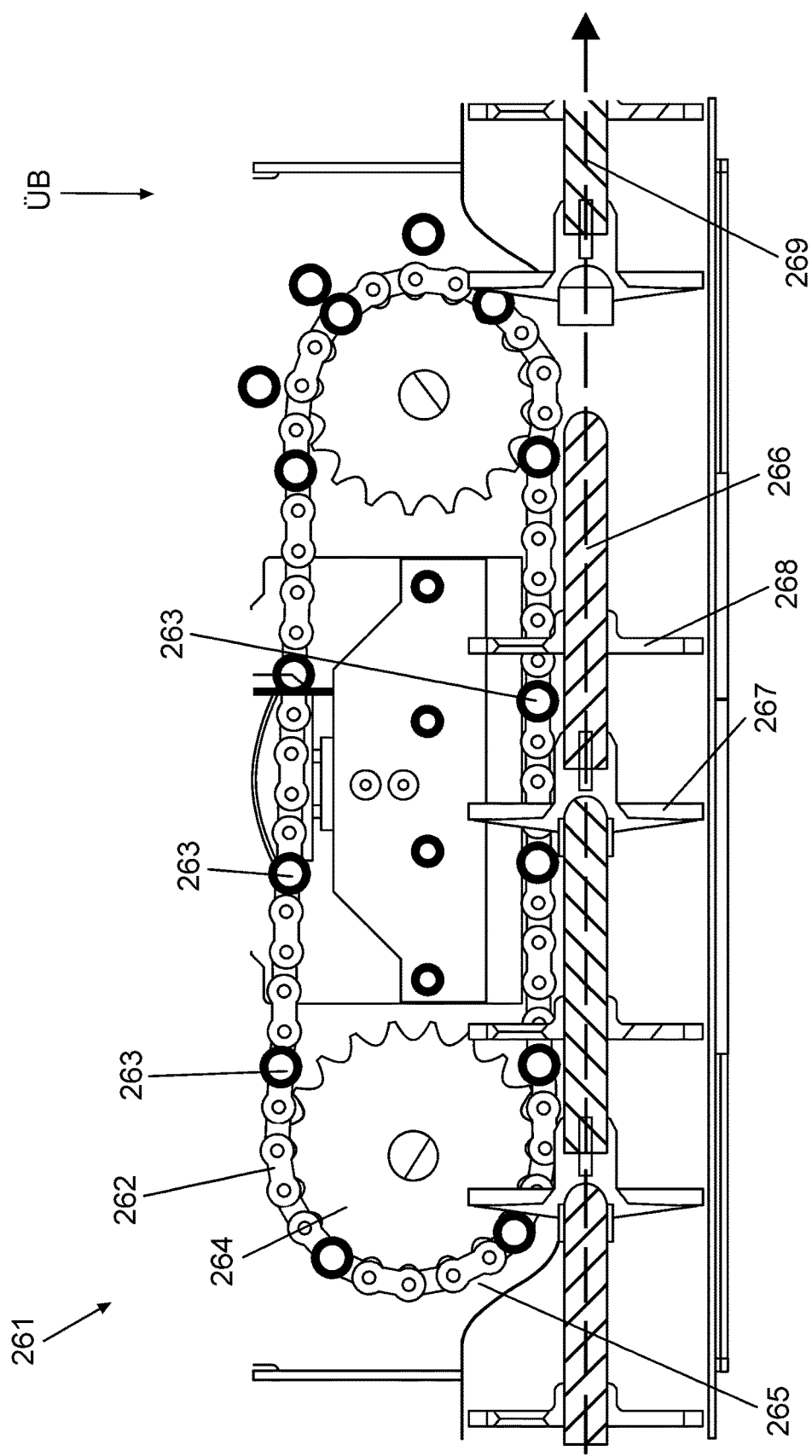
FIG. 26c shows a view of the embodiment of FIG. 26b.

For this reason, according to an embodiment of the invention additional drive elements (e.g. bolts) are provided in the drive means. In FIGS. 26b and 26c, the conveying element 266 is also pushed at its guide disk 268 by a bolt 263 in the conveying direction (see arrow). However, the conveying element 266 is only pushed by the bolt 263 until it comes up to a downstream conveying element 269 in a transition region UB from the first section 265 of the conveying pipe to a second section of the conveying pipe. Since in this embodiment the distance between scraper disk 267 and guide disk 268 of the conveying element 266 is slightly larger than the distance between two adjacent bolts 263 in the conveying direction, the conveying element 266 (and all subsequent conveying elements) slows down temporarily in the moment in which it comes up to the downstream conveying element, and the bolt 263a directly behind the presently power-transmitting bolt 263 engages with the scraper disk 267. In this moment the load thus changes from the weaker guide disk 268 to the more stable scraper disk 267 of the conveying element 266 and damage of the conveying element 266 can be prevented.

Figure 27A:
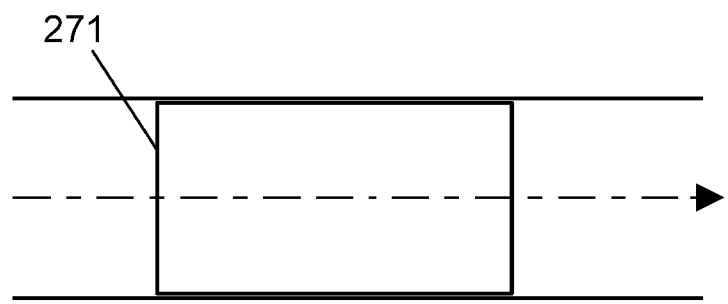
FIG. 27a shows a view of a pipe cutout according to the prior art.
Figure 27B:
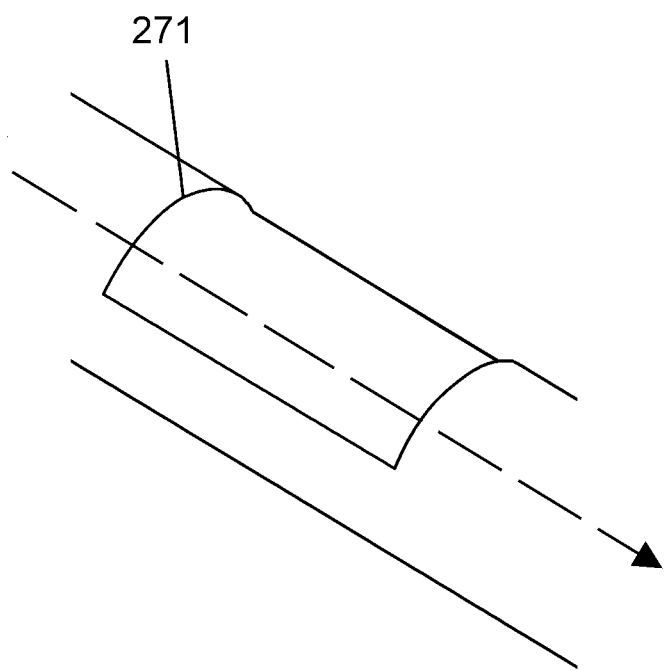
FIG. 27b shows a perspective view of a pipe cutout according to the prior art.

FIGS. 27a and 27b show an opening in a conveying pipe according to the prior art. Normally, pipe cutouts of this kind have a rectangular shape, but they are disadvantageous in that this shape leads to long cutout edges 271 extending perpendicularly with respect to the conveying direction (see arrow). Such abutting edges, however, can cause damage to the conveying elements, increased wear of the conveying disks and increased fracture of the bulk goods to be conveyed.

FIGS. 28 to 36 show embodiments of openings or pipe cutouts for the conveying channel of a conveying device of the invention.

Figure 28A:
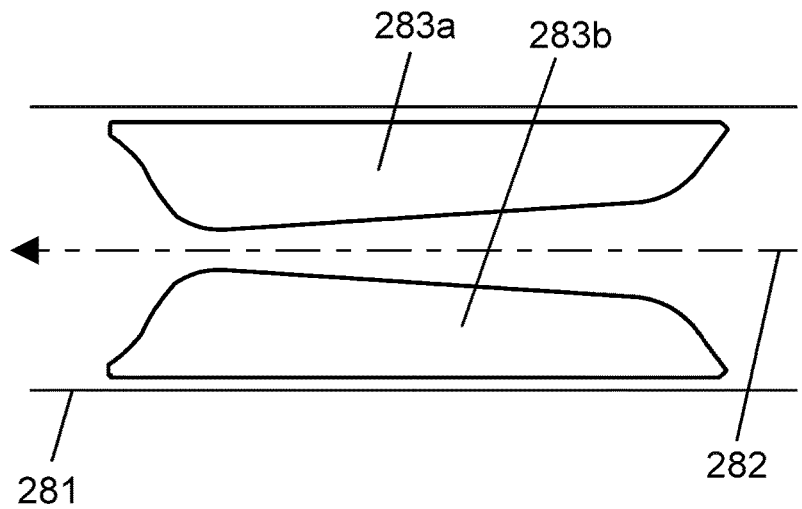
FIG. 28a shows a view of a pipe cutout, e.g., as feeding opening according to an embodiment of the present invention.
Figure 28B:
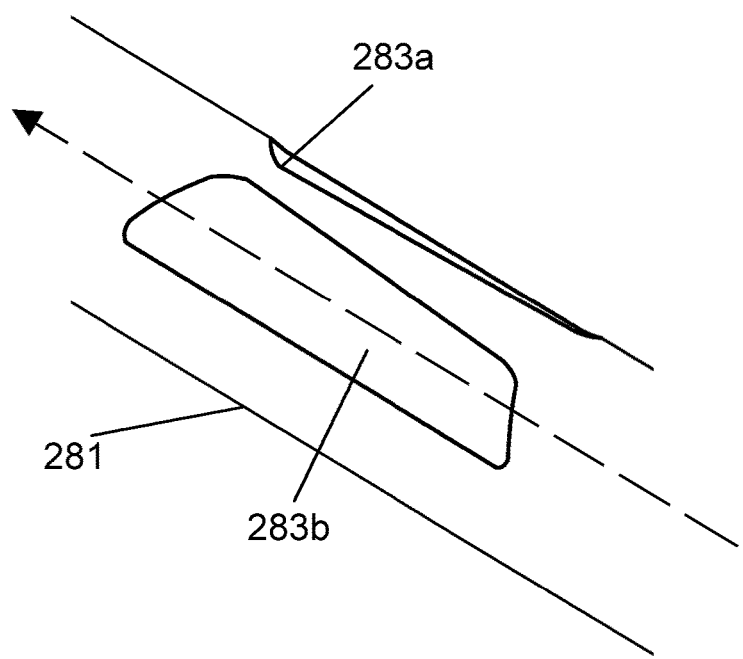
FIG. 28b shows a perspective view of a pipe cutout, e.g., as feeding opening according to an embodiment of the present invention.

FIG. 28a and FIG. 28b show, e.g., a feeding opening through which bulk goods can be fed into the conveying pipe. In particular, in this embodiment no cutout edge extends perpendicularly to the conveying direction (see arrow). Moreover, it can be provided that the feeding opening is formed of two pipe cutouts 283a and 283b being mirrored in a top view at the longitudinal axis 282 of the conveying pipe 281.

Figure 29A:
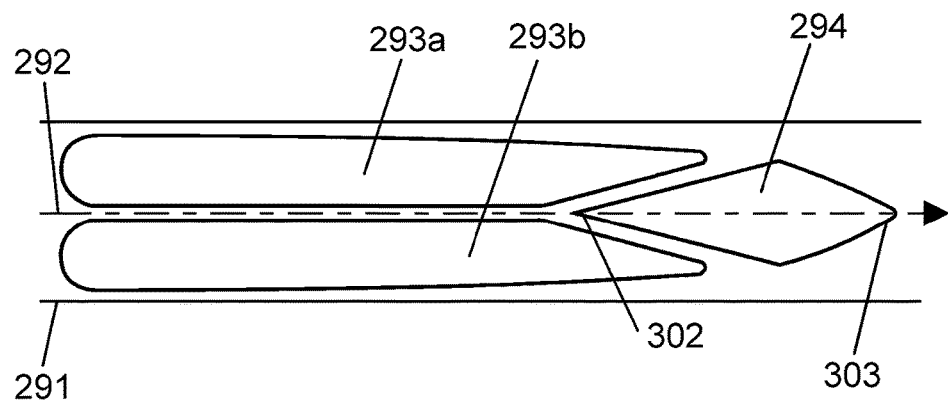
FIG. 29a shows a view of a pipe cutout, e.g., as outlet opening according to an embodiment of the present invention.
Figure 29B:
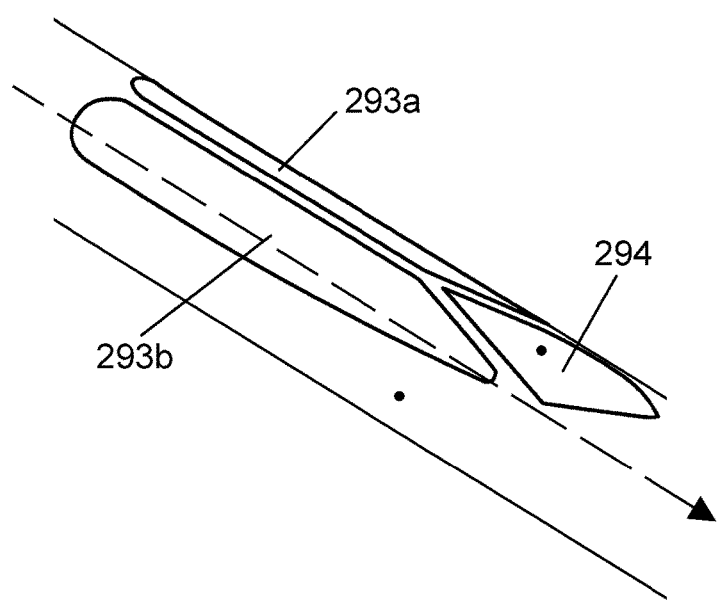
FIG. 29b shows a perspective view of a pipe cutout, e.g., as outlet opening according to an embodiment of the present invention.

FIG. 29a and FIG. 29b show, e.g., an outlet opening through which the bulk goods are removed from the conveying device. Here, too, in particular none of the cutout edges extends perpendicularly to the conveying direction (see arrow). In the shown embodiment, the outlet opening consists of two pipe cutouts 293a and 293b mirrored in a top view at the longitudinal axis 292 of the conveying pipe 291 and a pipe cutout 294 being symmetrical to this longitudinal axis. The pipe cutouts 293a and 293b have bent abutting edges at the point at which a conveying element moving in the conveying direction encounters the outlet opening in order to protect the conveying element from damage.

Figure 30A:
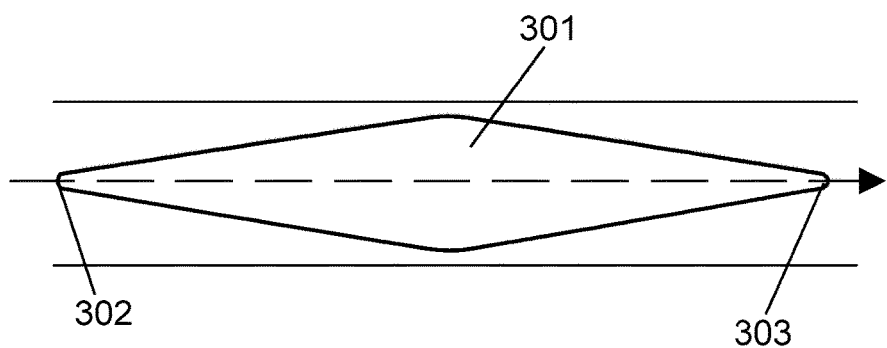
FIG. 30a shows a view of a pipe cutout, e.g., as outlet opening according to an embodiment of the present invention.
Figure 30B:
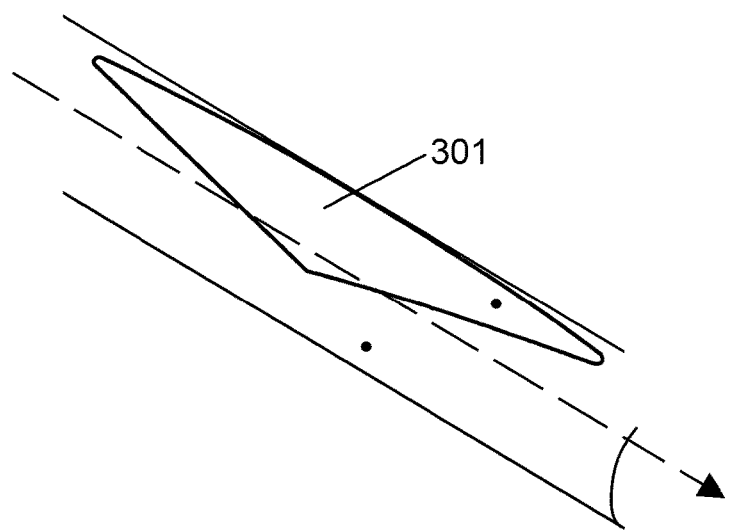
FIG. 30b shows a perspective view of a pipe cutout, e.g., as outlet opening according to an embodiment of the present invention.

In a top view, the pipe cutout 294 can have the geometrical shape of a kite and is in particular configured such that, e.g., also bulk goods located in the conveying pipe at the link between the pipe cutouts 293a and 293b are ejected from the outlet opening in order to avoid possible later mixing. As shown in FIGS. 30a and 30b, a kite of this kind can also serve alone as outlet opening 301, wherein in this case the more pointed end 302 of the kite 301 is passed by a conveying element moving in the conveying pipe in the conveying direction downstream of the opposite more obtuse end 303 (see arrow). In a particular embodiment, the kite can be rhombic.

Figure 31A:
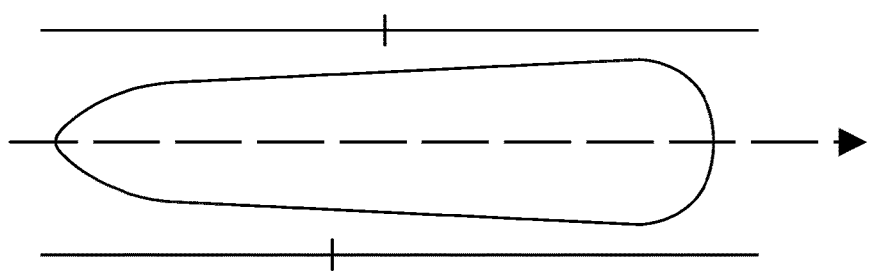
FIG. 31a shows a view of a pipe cutout, e.g., as outlet opening according to an embodiment of the present invention.
Figure 31B:
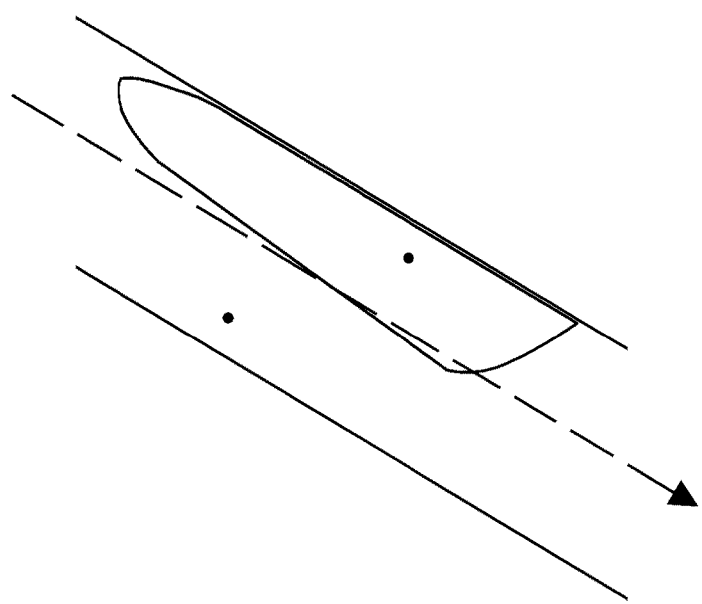
FIG. 31b shows a perspective view of a pipe cutout, e.g., as outlet opening according to an embodiment of the present invention.

In accordance with an embodiment, the outlet opening can have substantially the shape of an (elongate) drop, as shown, e.g., in FIGS. 31a and 31b. Here, too, in particular none of the cutout edges extends perpendicularly to the conveying direction (see arrow).

Figure 32A:
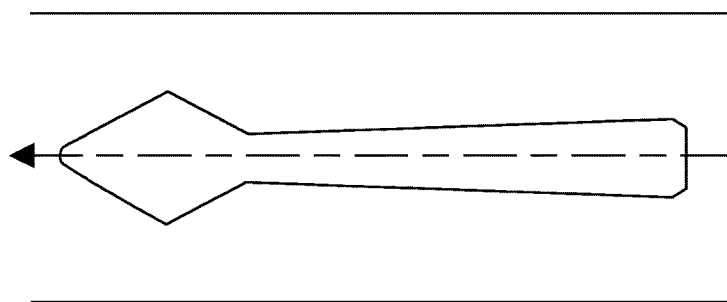
FIG. 32a shows a view of a pipe cutout, e.g., as viewing window according to an embodiment of the present invention.
Figure 32B:
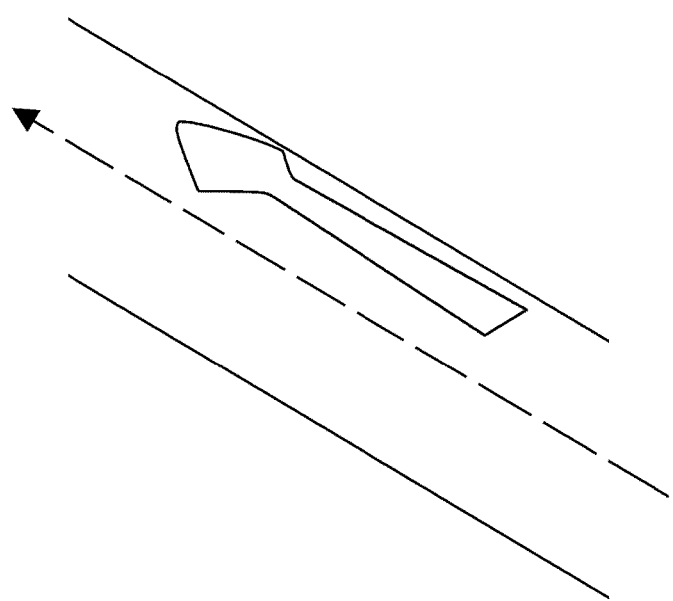
FIG. 32b shows a perspective view of a pipe cutout, e.g., as viewing window according to an embodiment of the present invention.

FIG. 32a and FIG. 32b show, e.g., a viewing window through which the conveying operation can be monitored. The width of the pipe cutout shown in the top view is smaller at the rearmost point of the opening in the conveying direction (see arrow) than at any other point of the pipe cutout. In particular, the pipe cutout can be substantially arrow-shaped and point in the conveying direction.

Figure 33A:
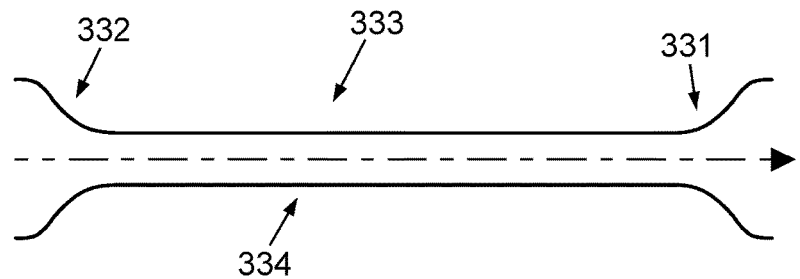
FIG. 33a shows a first view of a pipe cutout, e.g., as drive opening according to an embodiment of the present invention.
Figure 33B:
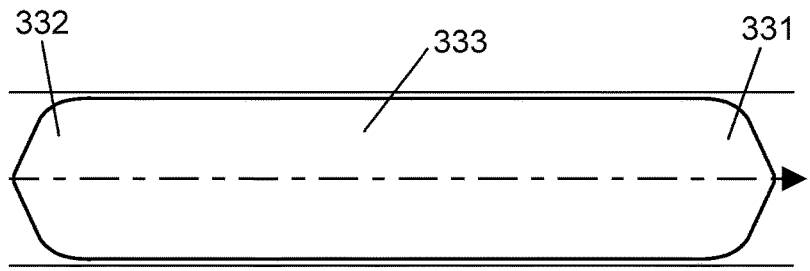
FIG. 33b shows a second view of a pipe cutout, e.g., as drive opening according to an embodiment of the present invention.
Figure 33C:
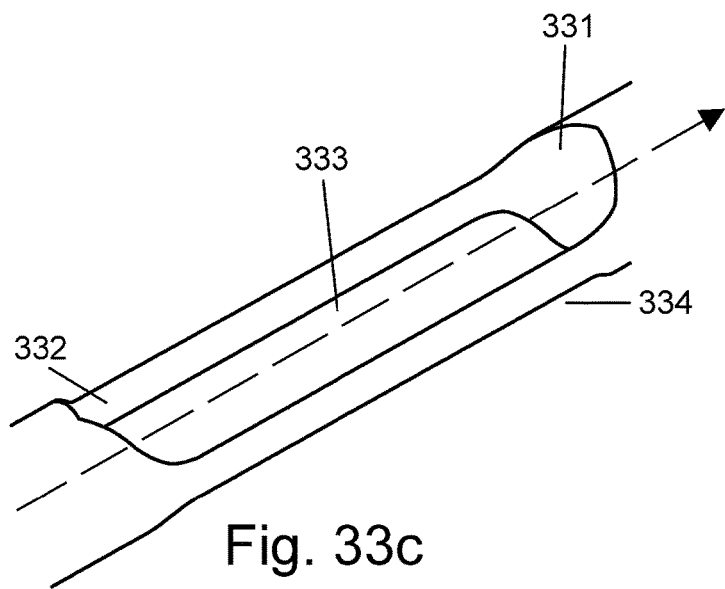
FIG. 33c shows a perspective view of a pipe cutout, e.g., as drive opening according to an embodiment of the present invention.
Figure 34A:
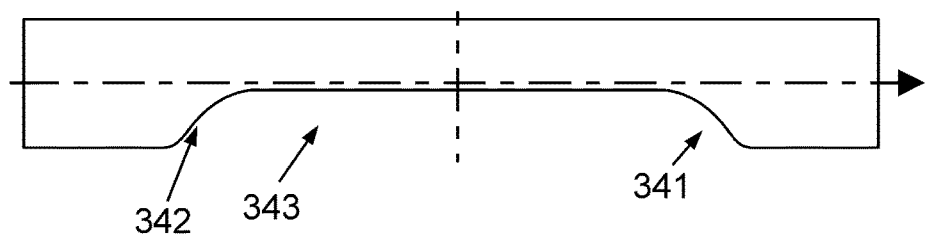
FIG. 34a shows a first view of a pipe cutout, e.g., as drive opening according to an embodiment of the present invention.
Figure 34B:
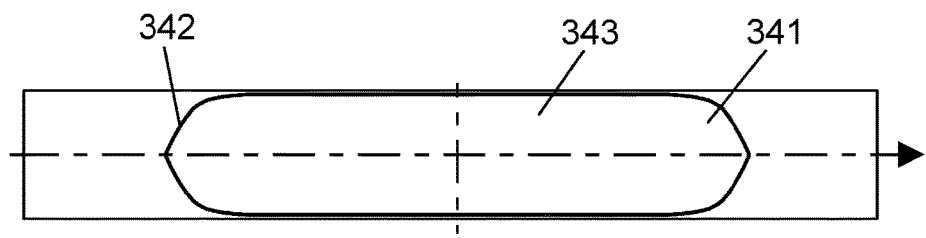
FIG. 34b shows a second view of a pipe cutout, e.g., as drive opening according to an embodiment of the present invention.
Figure 34C:
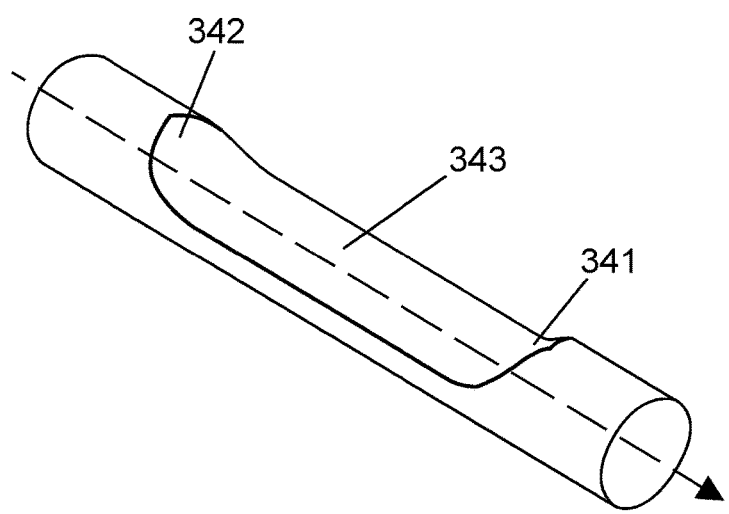
FIG. 34c shows a perspective view of a pipe cutout, e.g., as drive opening according to an embodiment of the present invention.

FIGS. 33a to 34c show, e.g., pipe cutouts as drive openings, wherein the pipe cutouts are arrowhead-shaped in a top view (see FIG. 33b) at their front areas 331, 341 and rear areas 332, 342 in the conveying direction (see arrow). In contrast to FIG. 33 with a first pipe cutout 333 and a second pipe cutout 334 being opposite to the first pipe cutout 333 in a side view (see FIG. 33a), the drive opening of FIG. 34 comprises only one pipe cutout 343. Two-sided pipe cutouts, as shown in FIG. 33, can be used in particular in the two-sided mechanical drives described above.

Figure 35A:
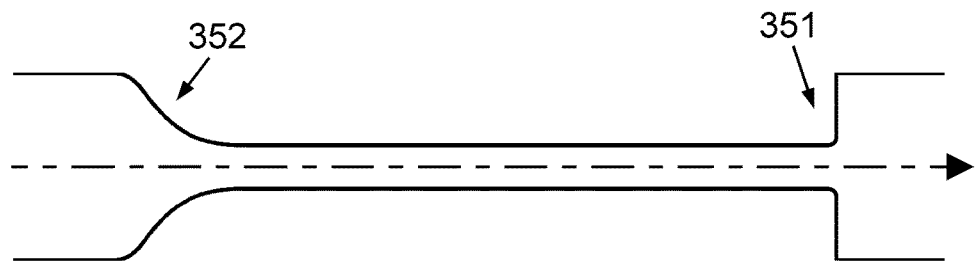
FIG. 35a shows a first view of a pipe cutout, e.g., as drive opening according to an embodiment of the present invention.
Figure 35B:
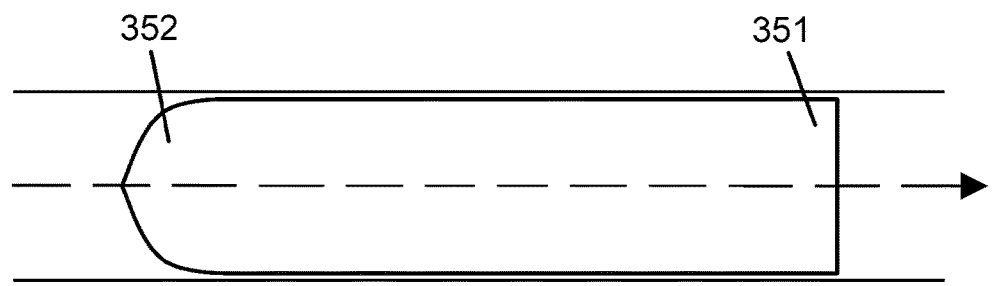
FIG. 35b shows a second view of a pipe cutout, e.g., as drive opening according to an embodiment of the present invention.
Figure 35C:
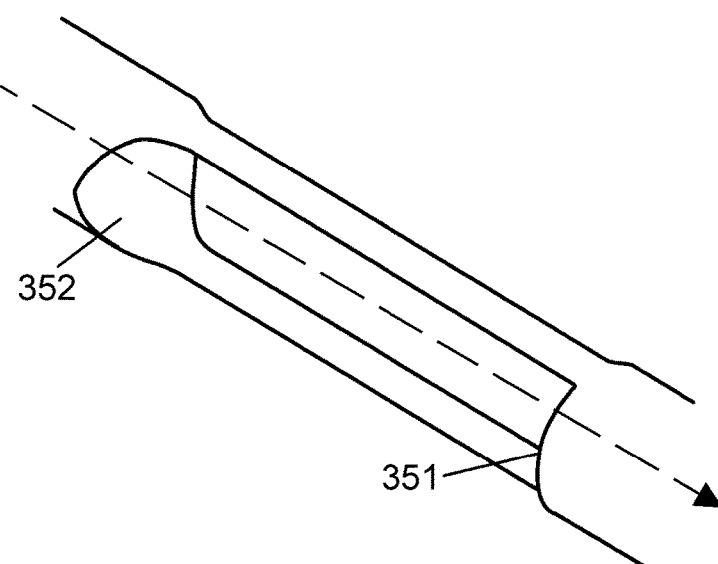
FIG. 35c shows a perspective view of a pipe cutout, e.g., as drive opening according to an embodiment of the present invention.

FIGS. 35a to 35c show pipe cutouts which can also serve as drive openings. In contrast to the embodiments of FIGS. 33 and 34, the pipe cutouts are not arrowhead-shaped in both areas 351 and 352 but only in the rear area 352 in the conveying direction. The front area 351 in the conveying direction of the pipe cutout can in this case be provided perpendicularly to the conveying direction.

Figure 36A:
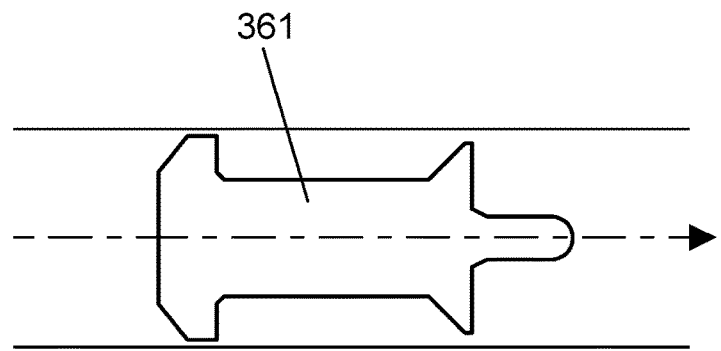
FIG. 36a shows a view of a pipe cutout, e.g., as insertion opening for a conveying element according to an embodiment of the present invention.
Figure 36B:
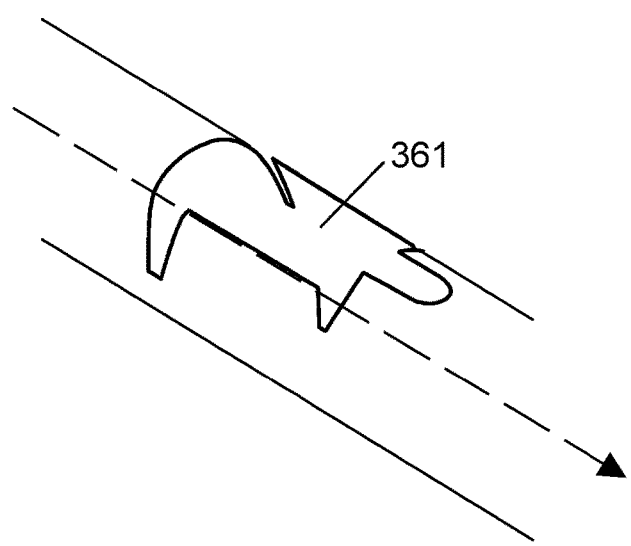
FIG. 36b shows a perspective view of a pipe cutout, e.g., as insertion opening for a conveying element according to an embodiment of the present invention.

FIG. 36a and FIG. 36b show, e.g., pipe cutouts as insertion opening for a conveying element. The insertion opening 361 for the conveying elements is configured, e.g., in accordance with the "poka yoke" principle in such a manner that only specific conveying elements 362 can be inserted into the conveying pipe 363, as also shown, e.g., in FIG. 36c. In this manner it can be prevented that, e.g., conveying elements are inserted with an incorrect distance between scraper disk 362a and guide disk 362b into the conveying device and can lead therein to malfunctions in particular when engaging with the drive means. For example, the shape of the insertion opening 361 in the conveying pipe wall can correspond substantially to the shape of the conveying element 363 projected onto the conveying pipe wall.

The present invention therefore provides a method and a conveying device by means of which the conveying performance can be increased while at the same time energy can be saved. Moreover, by means of the present concept, conveying heights of about 60 m can be reached, so that the conveying device as a whole needs a relatively small base surface while the conveying performance remains unchanged because a more effective usage is possible in all dimensions of the room, and moreover the conveying device can be configured individually. Since the bulk goods are conveyed in the conveying pipe by means of separate individual bodies (conveying elements, carriers) which push or press the bulk goods through the conveying pipe, there is only a slight relative movement of the bulk goods, which reduces segregation and inner friction. Moreover, the structure, assembly and maintenance of the conveying device is simple (such as the use of individual conveying elements) and it can moreover be cleaned easily because residues cannot collect in the conveying pipe and bulk goods cannot be carried off. Moreover, a drive is only necessary in a specific section of the conveying pipe so that—with the drive and the bulk goods feeding device being spatially separated—the drive does not come in contact with the bulk goods (high sanitation).

The invention claimed is:
1. A method for conveying bulk goods by means of a conveying device comprising a conveying channel and at least two conveying elements loosely arranged in the conveying channel, the method comprising the following:
   mechanically driving the conveying elements in the conveying direction in a first section of the conveying channel;
   feeding bulk goods into the conveying channel in a second section of the conveying channel;
   conveying the bulk goods by moving the conveying elements along the conveying direction in a third section of the conveying channel; and
   in the third section of the conveying channel, the first conveying element being pressed by the second conveying element and/or the bulk goods through the conveying channel in the conveying direction, wherein
   each of the at least two conveying elements has a longitudinal axis that is parallel to the conveying direction;
   each of the at least two conveying elements comprises a first surface element longitudinally spaced apart from a second surface element, each of the first and second surface elements extending transversely in relation to the longitudinal axis and at least one of the first and second conveying elements having a carrier surface configured to push bulk goods in the conveying direction;

a strut extending parallel to the longitudinal axis and connecting the first and second surface elements to each other; and a spacer arm connected to and extending away from at least one of the first and second surface elements in the conveying direction, or away from the conveying direction, thereby creating a minimum distance between a pair of successive surface elements of respective ones of the at least two conveying elements during said conveying of the bulk goods at least in the third section of the conveying channel.

2. The method according to claim 1, wherein:

during mechanical driving, a conveying element is in direct contact with at least one drive element via an opening in the first section of the conveying channel.

3. The method according to claim 2, wherein:

per length of a conveying element in the conveying direction, at least two drive elements are provided via the opening in the first section of the conveying channel.

4. The method according to claim 1, wherein:

a longitudinal axis of at least one conveying element is aligned substantially parallel to the conveying direction in the first section of the conveying channel.

5. The method according to claim 4, wherein:

the conveying elements are driven by direct contact with at least one conveying element in the first section of the conveying channel.

6. The method according to claim 4, wherein:

each of the conveying elements include a front disk and a rear disk spaced apart from the front disk; and the conveying elements in a transition area between the first and the second section of the conveying channel are driven by direct contact with the rear disk of the conveying element in the conveying direction.

7. A conveying device for conveying bulk goods, said device comprising:

a conveying channel and at least two conveying elements;

a mechanical drive configured to drive the conveying elements in a conveying direction in a first section of the conveying channel, the conveying elements being loosely arranged in the conveying channel;

the conveying channel comprising a feeding opening for feeding bulk goods in a second section of the conveying channel; and the conveying device being configured such that in a third section of the conveying channel the first conveying element is pressed by the second conveying element and/or bulk goods through the conveying channel in the conveying direction, wherein each of the at least two conveying elements has a longitudinal axis that is parallel to the conveying direction;

each of the at least two conveying elements comprises a first surface element longitudinally spaced apart from a second surface element, each of the first and second surface elements extending transversely in relation to the longitudinal axis and at least one of the first and second conveying elements having a carrier surface configured to push bulk goods in the conveying direction;

a strut extending parallel to the longitudinal axis and connecting the first and second surface elements to each other; and a spacer arm connected to and extending away from at least one of the first and second surface elements in the conveying direction, or away from the conveying direction, thereby creating a minimum distance between a pair of successive surface elements of respective ones of the at least two conveying elements during conveying of the bulk goods at least in the third section of the conveying channel.

8. The conveying device according to claim 7, wherein:

the conveying channel comprises an opening in the first section through which the drive pushes the conveying elements via direct contact therewith through the first section of the conveying channel in the conveying direction.

9. The conveying device according to claim 7, wherein:

the mechanical drive comprises at least two drive elements; and the distance between the drive elements in the conveying direction corresponds to half the length of one of the conveying elements.

10. The conveying device according to claim 7, wherein:

drive elements of the mechanical drive are bolts and/or hydraulic elements and/or pneumatic elements.

11. The conveying device according to claim 7, wherein:

the conveying channel has a non-rectangular feeding opening for bulk goods in the second section.

12. The conveying device according to claim 7, wherein:

the conveying channel has an opening whose width at the rearmost point of the opening in the conveying direction is smaller than at another point of the opening.

13. The conveying device according to claim 12, wherein:

the opening is a drive opening and/or the feeding opening and/or an outlet opening and/or a viewing window and/or an insertion opening for conveying elements.

14. The conveying device according to claim 7, wherein:

the conveying channel is provided to be lockable.

15. The conveying device according to claim 7, wherein:

at least one of the conveying elements is provided with a label for automatic identification and/or localization and the conveying device comprises a reader for reading out the label.

* * * * *